(12) United States Patent
Cole et al.

(10) Patent No.: US 12,243,145 B2
(45) Date of Patent: Mar. 4, 2025

(54) RE-TIMING OBJECTS IN VIDEO VIA LAYERED NEURAL RENDERING

(71) Applicant: Google LLC, Mountain View, CA (US)

(72) Inventors: Forrester H. Cole, Cambridge, MA (US); Erika Lu, Lexington, MA (US); Tali Dekel, Arlington, MA (US); William T. Freeman, Acton, MA (US); David Henry Salesin, Saualito, CA (US); Michael Rubinstein, Natick, MA (US)

(73) Assignee: GOOGLE LLC, Mountain View, CA (US)

( * ) Notice: Subject to any disclaimer, the term of this patent is extended or adjusted under 35 U.S.C. 154(b) by 68 days.

(21) Appl. No.: 17/927,101

(22) PCT Filed: May 22, 2020

(86) PCT No.: PCT/US2020/034296
§ 371 (c)(1),
(2) Date: Nov. 22, 2022

(87) PCT Pub. No.: WO2021/236104
PCT Pub. Date: Nov. 25, 2021

(65) Prior Publication Data
US 2023/0206955 A1 Jun. 29, 2023

(51) Int. Cl.
*G06T 13/80* (2011.01)
*G06V 10/44* (2022.01)
(Continued)

(52) U.S. Cl.
CPC ............ *G06T 13/80* (2013.01); *G06V 10/454* (2022.01); *G06V 10/82* (2022.01); *G06V 20/46* (2022.01);
(Continued)

(58) Field of Classification Search
CPC ...... G06T 13/80; G06V 20/49; G06V 10/454; G06V 20/46; G06V 10/82; G11B 27/005; G11B 27/031
See application file for complete search history.

(56) References Cited

U.S. PATENT DOCUMENTS

| | | | |
|---|---|---|---|
| 2004/0160453 A1* | 8/2004 | Horton | G06T 11/40 345/582 |
| 2008/0034292 A1* | 2/2008 | Brunner | G06T 1/20 715/764 |

(Continued)

FOREIGN PATENT DOCUMENTS

| | | |
|---|---|---|
| WO | WO 2001/035641 | 5/2001 |
| WO | WO 2003/027766 | 4/2003 |

OTHER PUBLICATIONS

Lu, "Layered Neural Rendering for Retiming People in Video", SIGGRAPH Asia 2020, https://www.youtube.com/watch?v=KAVCHRImucw, Sep. 10, 2020, retrieved on Dec. 12, 2023, 21 pages.

(Continued)

*Primary Examiner* — Sunghyoun Park
(74) *Attorney, Agent, or Firm* — DORITY & MANNING P.A.

(57) ABSTRACT

A computer-implemented method for decomposing videos into multiple layers (212, 213) that can be re-combined with modified relative timings includes obtaining video data including a plurality of image frames (201) depicting one or more objects. For each of the plurality of frames, the computer-implemented method includes generating one or more object maps descriptive of a respective location of at least one object of the one or more objects within the image frame. For each of the plurality of frames, the computer-implemented method includes inputting the image frame and the one or more object maps into a machine-learned layer (Continued)

Tenderer model. (220) For each of the plurality of frames, the computer-implemented method includes receiving, as output from the machine-learned layer Tenderer model, a background layer illustrative of a background of the video data and one or more object layers respectively associated with one of the one or more object maps. The object layers include image data illustrative of the at least one object and one or more trace effects at least partially attributable to the at least one object such that the one or more object layers and the background layer can be re-combined with modified relative timings.

22 Claims, 15 Drawing Sheets

(51) Int. Cl.
  *G06V 10/82* (2022.01)
  *G06V 20/40* (2022.01)
  *G11B 27/00* (2006.01)
  *G11B 27/031* (2006.01)
(52) U.S. Cl.
  CPC ............ *G06V 20/49* (2022.01); *G11B 27/005* (2013.01); *G11B 27/031* (2013.01)

(56) References Cited

U.S. PATENT DOCUMENTS

| | | | | |
|---|---|---|---|---|
| 2018/0075590 | A1* | 3/2018 | Yamasaki | H04N 5/765 |
| 2018/0158230 | A1* | 6/2018 | Yan | G06V 40/168 |
| 2019/0228264 | A1* | 7/2019 | Huang | G06N 3/045 |
| 2019/0289321 | A1* | 9/2019 | Liu | G06N 3/088 |
| 2020/0074642 | A1 | 3/2020 | Wilson et al. | |
| 2021/0004962 | A1* | 1/2021 | Tsai | G06T 7/11 |

OTHER PUBLICATIONS

Aberman et al., "Deep Video-Based Performance Cloning", arXiv:1808. 06847v1, Aug. 21, 2018, 10 pages.
Agarwala et al., "Panoramic Video Textures", https://grail.cs. washington.edu/projects/panovidtex/panovidtex.pdf, retrieved on Dec. 12, 2022, 8 pages.
Alayrac et al., "Controllable Attention for Structured Layered Video Decomposition", arXiv:1910.11306v1, Oct. 24, 2019, 14 pages.
Alayrac et al., "The Visual Centrifuge: Model-Free Layered Video Representations", arXiv:1812.01461v2, Apr. 4, 2019, 12 pages.
Bai et al., "Video SnapCut: Robust Video Object Cutout Using Localized Classifiers", Association for Computing Machinery—Transactions on Graphics, vol. 28, Issue 3, Aug. 2009, Article No. 70, pp. 1-11.
Barnes et al., "Video Tapestries with Continuous Temporal Zoom", Association for Computing Machinery—Transactions on Graphics, vol. 29, Issue 4, Jul. 2010, pp. 1-9.
Bennett et al., "Computational Time-Lapse Video", Association for Computing Machinery—Transactions on Graphics, vol. 26, Issue 3, Jul. 2007, 6 pages.
Castro et al., "Let's Dance: Learning from Online Dance Videos", arXiv:1801.07388v1, Jan. 23, 2018, 10 pages.
Chan et al., "Everybody Dance Now", 2019 Conference on Computer Vision and Pattern Recognition, Long Beach, California, United States, Jun. 15-19, 2019, pp. 5933-5942.
Chuang et al., "Animating Pictures with Stochastic Motion Textures", Association for Computing Machinery—Transactions on Graphics, vol. 24, Issue 3, Jul. 2005, 8 pages.
Chuang et al., "Video Matting of Complex Scenes", SIGGRAPH '02: 29th Annual Conference on Computer Graphics and Interactive Techniques, San Antonio, Texas, United States, Jul. 23-26, 2002, 6 pages.

Davis et al., "Visual Rhythm and Beat", Association for Computing Machinery—Transactions on Graphics, vol. 37, Issue 4, Aug. 2018, pp. 1-11.
Fang et al., "RMPE: Regional Multi-Person Pose Estimation", arXiv:1612.00137v5, Feb. 4, 2018, 10 pages.
Fradet et al, "Semi-Automatic Motion Segmentation with Motion Layer Mosaics", 10th European Conference on Computer Vision, Marseille, France, Oct. 12-18, 2008, pp. 210-223.
Gafni et al., "Vid2Game: Controllable Characters Extracted from Real-World Videos", arXiv:1904.08379v1, Apr. 17, 2019, 14 pages.
Gandelsman et al., ""Double-DIP": Unsupervised Image Decomposition via Coupled Deep-Image-Priors", arXiv:1812.00467v2, Dec. 5, 2018, 10 pages.
Goldman et al., "Video Object Annotation, Navigation, and Composition", 21st Annual Association for Computing Machinery Symposium on User Interface Software and Technology, Monterey, California, United States, Oct. 19-22, 2008, 10 pages.
Grundmann et al., "Auto-Directed Video Stabilization with Robust LI Optimal Camera Paths", 2011 Conference on Computer Vision and Pattern Recognition, Colorado Springs, Colorado, United States, Jun. 20-25, 2011, pp. 225-232.
Guler et al., "DensePose: Dense Human Pose Estimation in The Wild", arXiv:1802.00434v1, Feb. 1, 2018, 12 pages.
Hou et al., "Context-Aware Image Matting for Simultaneous Foreground and Alpha Estimation", arXiv:1909.09725v2, Oct. 2, 2019, 10 pages.
International Preliminary Report of Patentability for PCT/US2020/034296, mailed on Dec. 1, 2022, 8 pages.
International Search Report and Written Opinion for PCT/US2020/034296, mailed on Feb. 11, 2021, 13 pages.
Isola et al., "Image-to-Image Translation with Conditional Adversarial Networks", arXiv:1611.07004v3, Nov. 26, 2018, 17 pages.
Jojic et al., "Learning Flexible Sprites in Video Layers", Institute of Electrical and Electronics Engineers Computer Society Conference on Computer Vision and Pattern Recognition, Dec. 8-14, 2001, Kauai, Hawaii, United States, pp. 199-206.
Joshi et al., "Real-Time Hyperlapse Creation via Optimal Frame Selection", Association for Computing Machinery—Transactions on Graphics, vol. 34, Issue 4, Aug. 2015, 9 pages.
Kim et al., "Deep Video Portraits", arXiv:1805.11714vl, May 29, 2018, 14 pages.
Kingma et al., "Adam: A Method for Stochastic Optimization", arXiv:1412.6980v9, Jan. 30, 2017, 15 pages.
Kumar et al., "Learning Layered Motion Segmentations of Video", Tenth International Conference on Computer Vision, San Diego, California, United States, Jun. 20-25, 2005, 8 pages.
Lan et al., "FFNet: Video Fast-Forwarding via Reinforcement Learning", arXiv:1805.02792v1, May 8, 2018, 10 pages.
Lee et al., "MetaPix: Few-Shot Video Retargeting", arXiv:1910. 04742v2, Mar. 24, 2020, 13 pages.
Li et al., "Video Object Cut and Paste", SIGGRAPH '05: Association for Computing Machinery, Jul. 1, 2005, pp. 595-600.
Liu et al., "Neural Rendering and Reenactment of Human Actor Videos", arXiv:1809.03658v3, May 9, 2019, 14 pages.
Loper et al., "SMPL: A Skinned Multi-Person Linear Model", Association for Computing Machinery—Transactions on Graphics, vol. 34, Issue 6, Nov. 2015, 16 pages.
Martin-Brualla et al., "LookinGood: Enhancing Performance Capture with Real-time Neural Re-Rendering", arXiv:1811.05029v1, Nov. 12, 2018, 14 pages.
McCann et al., "Physics-Based Motion Retiming", 2006 Association for Computing Machinery's Special Interest Group on Computer Graphics and Interactive Techniques Symposium on Computer Animation, Vienna, Austria, Sep. 2-4, 2006, 10 pages.
Meshry et al., "Neural Rerendering in the Wild", arXiv:1904. 04290v1, Apr. 8, 2019, 16 pages.
Nandoriya et al., "Video Reflection Removal Through Spatio-Temporal Optimization", 2017 International Conference on Computer Vision, Venice, Italy, Oct. 22-29, 2017, pp. 2430-2438.
Newson et al., "Video Inpainting of Complex Scenes", arXiv:1503. 05528v2, Jun. 8, 2015, 27 pages.

(56) References Cited

OTHER PUBLICATIONS

Poleg et al., "EgoSampling: Fast-Forward and Stereo for Egocentric Videos", 2015 Conference on Computer Vision and Pattern Recognition, Boston, Massachusetts, United States, Jun. 7-12, 2015, pp. 4768-4776.
Porter et al., "Compositing Digital Images", ACM SIGGRAPH Computer Graphics, vol. 18, Issue Jul. 3, 1984, pp. 253-259.
Pritch et al., "Nonchronological Video Synopsis and Indexing", Transactions on Pattern Analysis and Machine Intelligence, vol. 30, No. 11, Nov. 2008, pp. 1971-1984.
Rublee et al., "ORB: An Efficient Alternative to SIFT or SURF", 2011 International Conference on Computer Vision, Washington, District of Columbia, United States, Nov. 6-13, 2011, pp. 2564-2571.
Silva et al., "A Weighted Sparse Sampling and Smoothing Frame Transition Approach for Semantic Fast-Forward First-Person Videos", 2018 Conference on Computer Vision and Pattern Recognition, Salt Lake City, Utah, United States, Jun. 18-23, 2018, pp. 2383-2392.
Shin et al., "3D Scene Reconstruction with Multi-layer Depth and Epipolar Transformers", arXiv:1902.06729v2, Aug. 27, 2019, 28 pages.
Sitzmann et al., "Deep Voxels: Learning Persistent 3D Feature Embeddings", arXiv:1812.01024v2, Apr. 11, 2019, 10 pages.
Srinivasan et al., "Pushing the Boundaries of View Extrapolation with Multiplane Images", arXiv:1905.00413v1, May 1, 2019, 12 pages.
Thies et al., "Deferred Neural Rendering: Image Synthesis Using Neural Textures", arXiv:1904.12356v1, Apr. 28, 2019, 12 pages.
Tomasi et al., "Correlation Optimized Warping and Dynamic Time Warping as Preprocessing Methods for Chromatographic Data", Journal of Chemometrics, vol. 18, Issue 5, May 2004, pp. 231-241.
Ulyanov et al., "Deep Image Prior", 2018 Conference on Computer Vision and Pattern Recognition, Salt Lake City, Utah, United States, Jun. 18-23, 2018, pp. 9446-9454.
Wang et al., "Interactive Video Cutout", SIGGRAPH '05: Association for Computing Machinery—Transactions on Graphics, vol. 24, Issue 3, Jul. 2005, pp. 585-594.
Wang et al., "Representing Moving Images with Layers", Transactions on Image Processing, vol. 3, No. 5, Sep. 1, 1994, pp. 625-638.
Wexler et al., "Space-Time Completion of Video", Transactions on Pattern Analysis and Machine Intelligence, vol. 29, No. 3, Mar. 2007, pp. 463-476.
Xiu et al., "Pose Flow: Efficient Online Pose Tracking", arXiv:1802.00977v2, Jul. 2, 2018, 12 pages.
Xu et al., "Deep Image Matting", arXiv:1703.03872v3, Apr. 11, 2017, 10 pages.
Xue et al., "A Computational Approach for Obstruction-Free Photography", Association for Computing Machinery—Transactions on Graphics, vol. 34, Issue 4, Aug. 2015, pp. 1-11.
Yoo et al., "Motion Retiming by Using Bilateral Time Control Surfaces", vol. 47, Apr. 2015, pp. 59-67.
Zhou et al., "Dance, Dance Generation: Motion Transfer for Internet Videos", arXiv:1904.00129v1, Mar. 30, 2019, 9 pages.
Zhou et al., "Stereo Magnification: Learning View Synthesis using Multiplane Images", arXiv:1805.09817v1, May 24, 2018, 12 pages.
Zhou et al., "Time-Mapping Using Space-Time Saliency", 2014 Conference on Computer Vision and Pattern Recognition, Columbus, Ohio, United States, Jun. 23-28, 2014, pp. 3358-3365.
Zitnick et al., "High-Quality Video View Interpolation Using a Layered Representation", Association for Computing Machinery—Transactions on Graphics, vol. 23, Issue 3, Aug. 2004, pp. 600-608.

\* cited by examiner

RE-TIMING OBJECTS IN VIDEO VIA LAYERED NEURAL RENDERING

PRIORITY CLAIM

This application is based upon and claims the right of priority under 35 U.S.C. § 371 to International Application No. PCT/US2020/034296 filed on May 22, 2020, which is incorporated by reference herein.

FIELD

The present disclosure relates generally to video processing. More particularly, the present disclosure relates to systems and methods for separating videos into multiple layers that can be re-combined with modified relative timings.

BACKGROUND

By manipulating the timing of people's movements in a video, a variety of effects can be achieved that can change the proposed perception of an event recorded in the video. As examples, in films, altering time by speeding up, slowing down, or syncing people's motion is often used for dramatizing or de-emphasizing certain movements or events in a video. For example, by freezing the motions of some people in an action-packed video while allowing others to move, a viewer's attention can be focused on specific people of interest.

Motion retiming has been mostly studied so far in the context of character animation and has been used as tool for editing a character's motion to match a desired duration or target velocity at a given time. However, these animation-focused techniques are not directly applicable to the realm of natural real videos. For example, in the character animation domain, the main challenge can be to retime the motion of a set of joints, with the spatiotemporal correlations that exist between them. However, analogously, manipulating the timing of people in video not only requires modifying people's self-motion, but also all the various elements in the scene that are correlated with them—shadows, reflections, the flowing dress of a dancer, or splashing water.

As such, video processing systems which seek to retime people within a video should make sure that all the correlative events in the scene follow and respect the timing changes. Furthermore, unlike character animation, systems seeking to retime natural real videos do not have any ground truth 3D model of the scene over time; hence rendering photorealistic, high-quality retiming effects in video is much more challenging.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for decomposing videos into multiple layers that can be re-combined with modified relative timings. The computer-implemented method can include obtaining, by a computing system including one or more computing devices, video data. The video data can include a plurality of image frames depicting one or more objects. For each of the plurality of frames, the computer-implemented method can include generating, by the computing system, one or more object maps. Each of the one or more object maps can be descriptive of a respective location of at least one object of the one or more objects within the image frame. For each of the plurality of frames, the computer-implemented method can include inputting, by the computing system, the image frame and the one or more object maps into a machine-learned layer renderer model. For each of the plurality of frames, the computer-implemented method can include receiving, by the computing system as output from the machine-learned layer renderer model, a background layer illustrative of a background of the video data and one or more object layers respectively associated with one of the one or more object maps. For each image frame, each of the one or more object layers can include image data illustrative of the at least one object and one or more trace effects at least partially attributable to the at least one object such that the one or more object layers and the background layer can be re-combined with modified relative timings.

Another example aspect of the present disclosure is directed to a computing system configured to decompose video data into a plurality of layers. The computing system can include one or more processors and one or more non-transitory computer-readable media that store instructions that, when executed by the one or more processors, cause the computing system to perform operations. The operations can include obtaining, by a computing system including one or more computing devices, video data. The video data can include a plurality of image frames depicting one or more objects. For each of the plurality of frames, the operations can include generating, by the computing system, one or more object maps. Each of the one or more object maps can be descriptive of a respective location of at least one object of the one or more objects within the image frame. For each of the plurality of frames, the operations can include inputting, by the computing system, the image frame and the one or more object maps into a machine-learned layer renderer model. For each of the plurality of frames, the operations can include receiving, by the computing system as output from the machine-learned layer renderer model, a background layer illustrative of a background of the video data and one or more object layers respectively associated with one of the one or more object maps. For each image frame, each of the one or more object layers can include image data illustrative of the at least one object and one or more trace effects at least partially attributable to the at least one object such that the one or more object layers and the background layer can be re-combined with modified relative timings.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art can be set forth in the specification, which makes reference to the appended figures, in which.

DETAILED DESCRIPTION

Overview

Generally, the present disclosure is directed to systems and methods that enable retiming of people or other objects in an ordinary, natural video, such as manipulating and editing the time in which the different motions of the various individuals in the video occur. Example implementations of the present disclosure can temporally align different motions, change the speed of certain actions (e.g., speeding up/slowing down, or entirely "freezing" objects), or "erase" selected objects from the video. These effects can be used to enhance the way video observers perceive and interact with the proposed dynamic world through ordinary videos. For example, by freezing certain motions in an action-packed video, and letting just one object move, example implementations of the present disclosure can focus a viewer's attention on that particular object.

Example implementations of the present disclosure can achieve these effects computationally via a dedicated learning-based layered video representation. Each frame in the video can be decomposed into separate RGBA layers, representing the appearance of different objects in the video. One valuable property of the proposed model is that it not only can disentangle the direct motions of each object in the input video, but can also correlate each object with the scene changes it generates (e.g., shadows, reflections, and/or motion of loose clothing) which are collectively referred to herein as "trace effects."

The layers can be individually retimed and recombined into a new video. This can allow a video processing system to generate realistic, high-quality renderings of retiming effects for real-world videos depicting complex actions involving many different individuals, including dancing, trampoline jumping, or group running.

More particularly, the input to the proposed method can be an ordinary natural video with multiple objects moving, and the output can be a realistic re-rendering of the video where the timing of objects' movements can be modified. The proposed systems and methods support various retiming effects including aligning motions of different objects, changing the speed of certain actions (e.g., speeding up/slowing down, or entirely "freezing" objects). In addition, the proposed techniques can also "erase" selected objects from the video.

Some example implementations of the present disclosure focus on temporal warping, but do not perform generative actions. That is, the pose or other configuration of each object (e.g., person) in the proposed output exists in some frame in the input and new, unseen poses or viewpoints are not generated.

Figure 1A:
FIGS. 1A-C depict an example application of layered neural rendering techniques according to example embodiments of the present disclosure.
Figure 1B:
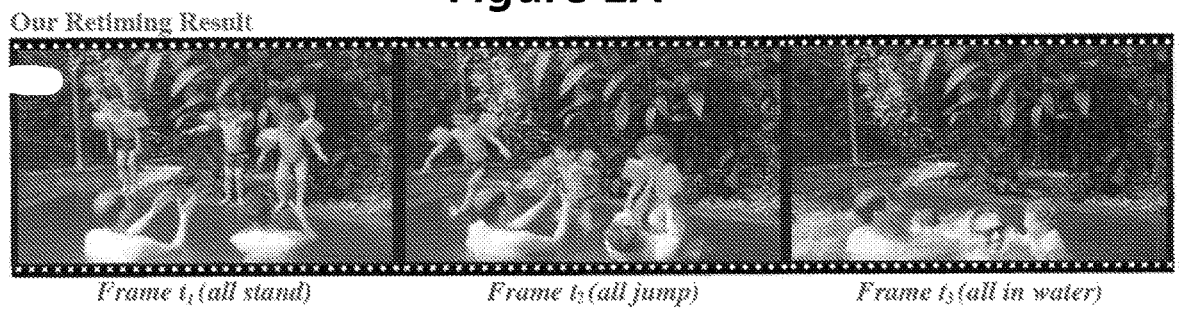
Figure 1C:
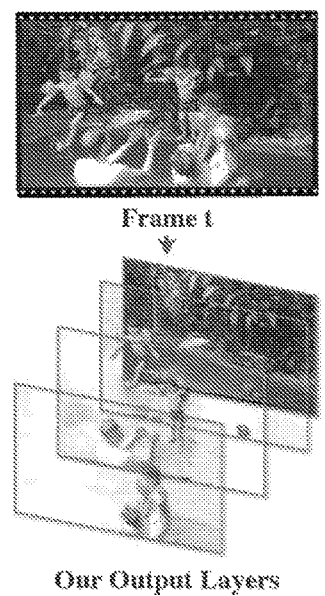

FIGS. 1A-C show one example application of the techniques described herein. In particular, FIG. 1A shows a plurality of frames of the original video in which each of a number of children jump into the pool at a different time. FIG. 1B shows a plurality of retimed frames of a computationally retimed video. As can be seen in the frames of the retimed video of FIG. 1B, the jumps of children I and III are time-aligned with that of child II, such that they all jump together into the pool. Child II remains unchanged in the input and output frames.

Example implementations of the present disclosure can produce this and other retiming effects in natural, ordinary videos. The proposed techniques can leverage a novel deep neural network that learns a layered decomposition of the input video. An example of this decomposition is shown in FIG. 1C. For instance, the proposed model can not only disentangle the motions of objects in different layers, but can also capture the various scene elements (e.g., trace effects) that are correlated with those objects (e.g., water splashes as the children hit the water, shadows, reflections). When objects are retimed, the trace effects can get automatically retimed with the objects because of the learned association with the object. This can allow a user (e.g., a user of a video editing program) to create realistic and faithful re-renderings of the video for a variety of retiming effects.

As one example, the core of the proposed technique can be a novel deep neural network-based model that learns a layered decomposition of the input video. More specifically, each frame of the original video can be decomposed into a set of layers, each consisting of an RGB color image and an opacity matte a (referred to altogether as "RGBA"). Example implementations of the present disclosure can include designing and training the proposed model such that each RGBA layer over time can be associated with specific objects in the video (e.g., a single person, or a group of people predefined by the user to be collectively treated as a group). This allows the proposed model to not only disentangle the motion of objects at different layers, but also to correlate objects with the changes in the scene (e.g., trace effects) that are related to the objects.

Given the decomposed layers defining each of the objects, the original frames of the video can be easily reconstructed (e.g., using standard back-to-front compositing). For instance, retiming effects can be produced by simple operations on layers (removing, copying, or interpolating specific layers) without additional training or processing. This can allow for simple video editing software to be used to implement the retiming effects.

Example embodiments of the present disclosure will be discussed in further detail. For the purpose ease of explication, example embodiments of the present disclosure are described herein with respect to retiming of people or persons in videos. However, the proposed techniques are equally applicable to retiming of other objects in videos, including, for example, animals, inanimate objects (e.g., cars or other vehicles, traffic signs, etc.), and/or any other objects. Thus, further references to people or persons should be construed as extendible to any form of object.

Example Techniques

Given an input video with multiple people naturally moving, the present disclosure provides a model suitable for supporting various retiming effects, including temporally aligning motions of different people or changing the speed of certain people (for example speeding up/slowing down, or entirely freezing them). However, achieving high-quality renderings of such effects poses several fundamental challenges. For instance, one challenge can be motion correlation. Example implementations of the present disclosure can isolate not only a subject's motion, but also all motion caused by the subject (e.g., trace effects). For example, in FIGS. 1A-1C, each child causes splashing as they hit the water. Other common cases of trace effects include reflections, shadows, or objects attached to the subject such as loose clothing. As another example, a challenge can be occlusions and disocclusions. Retiming motions can often result in new occlusions and disocclusions in the scene. Rendering the scene content in disoccluded regions and maintaining correct depth ordering between subjects can contribute to achieving a high-quality, realistic effect. Another example challenge can be temporal coherence. Achieving a temporally coherent result can be challenging—small errors such as subtle misalignment between frames can show up as noticeable visual artifacts when the frames are viewed as a video.

Example implementations of the present disclosure can address these challenges via a deep neural network that learns a decomposition of the input video V into layers. In some implementations, the proposed model can be trained only on the input video, i.e., without any external data, in a self-supervised manner without requiring any manual annotations. In the following sections example implementations of the present disclosure describe the proposed layered video representation, neural rendering model, training scheme, and data pre-processing.

Example Layered Video Representation

Given an input video V, the proposed goal can be to decompose each frame $I_t \in V$ into a set of N layers:

$$\mathcal{L}_t = \{L_t^i\}_{i=1}^N = \{C_t^i, \alpha_t^i\}_{i=1}^N, \quad (1)$$

where $C_t^i$ can be a color (RGB) image and $\alpha_t^i$ can be an opacity map (matte). The $i^{th}$ layer for all frames $L_*^i$ can be associated with person i in the video. Example implementations of the present disclosure can add an additional background layer $L_t^0$, not associated with any person or object, that learns the background color and/or background scene. This can include a moving background, in some implementations. For instance, a moving background can be compensated for by known camera dynamics.

Given this layered representation and a back-to-front ordering for the layers, denoted by $o_t$, each frame of the video can be rendered by a standard "over" operator (e.g., an ordered overlay). Example implementations of the present disclosure denote this operation by:

$$\hat{I}_t = \text{COMP}(\mathcal{L}_t, o_t) \quad (2)$$

Example implementations of the present disclosure assume that the compositing order $o_t$ can be known, yet time varying, i.e., the depth ordering between people may change throughout the video.

A key property of this representation can be that retiming effects can be achieved by simple operations on individual layers. For example, removing person i from frame t can be done simply by removing the $i^{th}$ layer from the composition (e.g., by substituting in $\mathcal{L}_t \setminus L_t^i$ into Eq. 2). Similarly, generating a video where person i can be frozen at a time $t_0$ can be achieved by copying $L_{t_0}^i$ over $L_t^i$ for all frames. Example operations include person removal, motion freeze and a 'photo finish' effect.

Some existing video retiming tools provide UV coordinates only for fully visible regions. In contrast, the proposed method can be able to produce full-body UVs for occluded people. For instance, the proposed method can first include training a network on an external dataset of keypoint and UV map pairs. The method can then include inputting the occluded person's full skeleton. This can allow for the creation of editing effects that require disoccluding people.

Estimating the set of layers $\mathcal{L}_t$ from an ordinary real-world video can be a difficult and/or under-constrained problem. For instance, there can be numerous possible decompositions that can provide an accurate reconstruction of the original frame $I_t$. For example, a single visible layer can contain the entire frame. To produce realistic high-quality renderings of retiming effects, each layer should thus not only accurately disentangle each person and its self-motion, but also capture all the motion and/or other trace effects that that person causes in the scene. Furthermore, the information captured by every set of layers $\mathcal{L}_t$ can desirably expand beyond the visible content at frame $I_t$. This can support inpainting of people or background content that can be disoccluded when retiming motion. Thus, in some embodiments, imposing additional constraints and priors in order to steer the solution towards the desired decomposition can be beneficial. Example implementations of the present disclosure can do so indirectly by the proposed model design. For instance, the structure of convolutional neural networks as a prior that can pull the result towards a naturally plausible decomposition. Additionally and/or alternatively, this can be accomplished directly by training regimes and losses according to example aspects of the present disclosure.

Example Layered Neural Rendering

The proposed model can combine a neural rendering approach (e.g., integration of traditional elements from graphics rendering with recent advances in deep learning) in a novel human-specific layered video representation, which example implementations of the present disclosure dub layered neural rendering.

Figure 2:
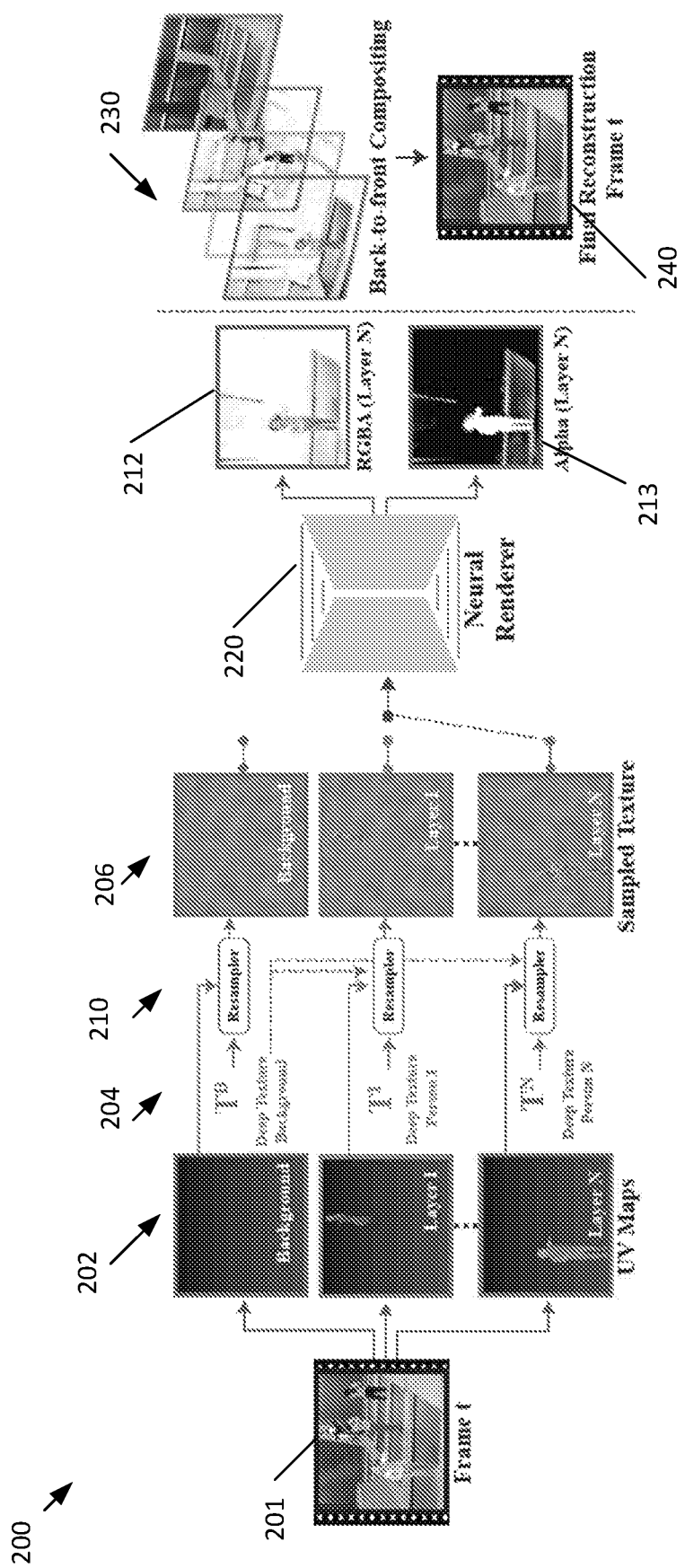
FIG. 2 depicts an example processing pipeline for performing layered neural rendering techniques according to example embodiments of the present disclosure.

One example pipeline 200 is illustrated in FIG. 2. At a high level, the proposed pipeline 200 can first include estimating the geometry for each person in the video (e.g., using a combination of existing off-the-shelf tools and the proposed own). For instance, the pipeline can include obtaining a video 201 including a plurality of image frames. Additionally, the pipeline can include generating one or more object maps 202 (e.g., UV maps) descriptive of the geometry. For instance, each of the one or more object maps 202 can be descriptive of a respective location of at least one object of the one or more objects within the image frame. The object maps 202 can be used to sample from deep texture maps 204 by resampler 210, then individually passed to the neural rendering network 220 to produce RGBA layers 212 (including a color layer and/or an opacity or a layer 213). The layers can, when composited (e.g., at 230), reconstruct the original video frame 240. To produce editing effects, example implementations of the present disclosure can use the RGBA layers 212 predicted by the neural renderer 220 during training, and modify the original video by adjusting the layers 212 (e.g., turning layers on/off, changing their speed, and playing different layers with different temporal offsets).

As an example, FIG. 2 shows an example machine-learned layer rendering model 220. The layer rendering model can decompose each frame of the video into a set of RGBA layers (color and opacity). Each layer can be associated with specific people in the video (either a single person, or a group of people predefined by the user). For example, the people or objects can be defined by a UV map. The layers can be computed in separate forward passes by feeding to the neural renderer a deep-texture map that corresponds to a single layer. In particular, example implementations of the present disclosure represent each person in the video with a single deep-texture map $T^i$, and the scene background can be represented with a deep-texture map $T^B$. Given pre-computed UV maps, those deep-texture maps are resampled and composited to form the input to the neural renderer. The set of estimated layers can then be composited in a back-to-front fashion to reconstruct the original frames. Retiming effects can be achieved via simple operations on the layers.

The background can be represented with a single texture map $T^0$ for the entire video. Sampling from the background can be performed according to a UV map $UV_t^0$. In cases where the camera is static, $UV_t^0$ can be an identical xy coordinate grid for all frames. If the camera is in motion, camera tracking can be used in determining the background. For instance, if homography transformations estimated from camera tracking are available, $UV_t^0$ can be the result of transforming an xy coordinate grid by the homography for frame t.

Example implementations of the present disclosure can represent each person in the video with a single human texture atlas $T^i$ (204) and a per-frame object map (e.g., UV-coordinate map) $UV_t^i$ (202), which maps pixels (e.g., each pixel) in the human region in a frame $I_t$ to the texture map 204. Example implementations of the present disclosure can use the parameterization of the SMPL model that can be estimated from an input image using existing methods (e.g., DensePose). This representation can provide a unified parameterization of the person over time and a convenient model for appearance and texture. Additionally, the background's UV map can be placed behind each person's UV map to provide background context for the renderer network. This can allow the neural renderer to learn effects that a person can have on their environment, such as shadows or trampoline deformations.

Figure 5:
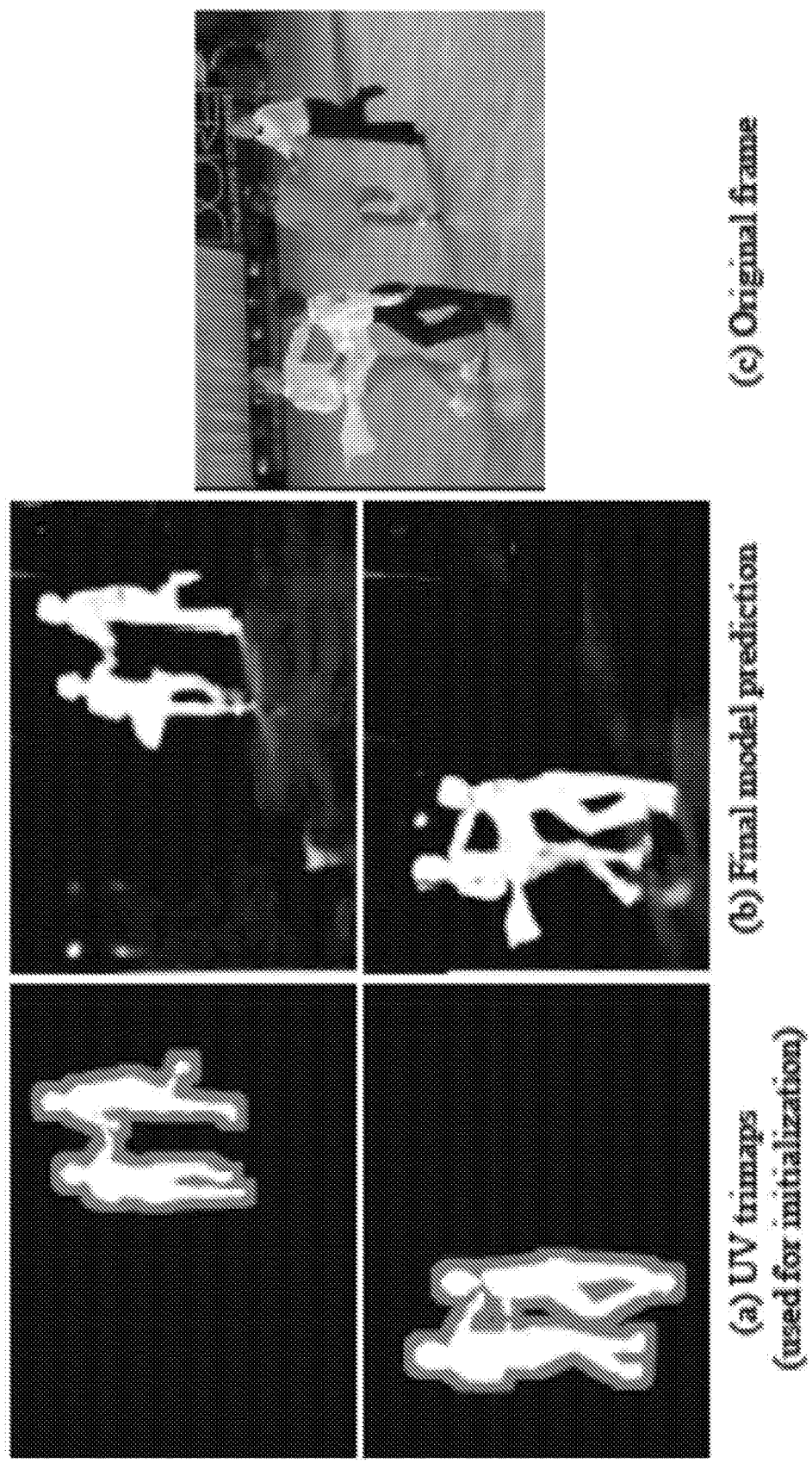
FIGS. 5A-C depict example trimaps and images according to example embodiments of the present disclosure.

To help the network converge, example implementations of the present disclosure can initially train the neural network to predict alpha mattes that match the UV trimaps. For instance, as depicted in FIG. 5, the gray pixels represent a dilated region around the person's UV for which this matching loss can be downweighted. This can allow the network flexibility to match the body variations, hair, and clothing that are not represented by the UV maps. The final model prediction can thus be a much more accurate segmentation mask, which may include correlated regions such as shadows or other trace effects.

Example implementations of the present disclosure can, in some embodiments, replace a classic RGB texture map with a learnable, high-dimensional texture map, which can encode more powerful and richer appearance information. The deep texture maps can then be encoded into RGB values using a neural rendering network. More specifically, the proposed neural rendering network can receive as input a sampled deep texture map $T_t^i$ that corresponds to the $i^{th}$ layer at time t. The neural rendering network can then output $L_t^i = \{C_t^i, \alpha_t^i\}$, the time-varying color image and opacity map for that layer, respectively.

Example implementations of the present disclosure can control the mapping between people in the video and the output layers by controlling the input sampled texture $T_t^i$ (204). For example, to associate layer i with person i in the video, example implementations of the present disclosure can re-sample $T^i$ (the texture map of person i) by resampler 210 using $UV_t^i$. To allow the model to also capture the correlations between the person and the motions related to them in the scene, example implementations of the present disclosure can composite the sampled texture over the sampled background texture. This composite deep texture can form the input to the proposed neural rendering network for layer i.

Each of the re-sampled texture layers $\{T_{t_i}^{i^N}\}_{i=1}$ and the background re-sampled texture can be fed to the neural rendering network in a separate feed-forward pass (e.g., as illustrated in FIG. 2). By controlling and disentangling the inputs to the neural rendering network, example implementations of the present disclosure can indirectly guide the decomposition. The decomposed layers can then be recomposed (e.g., using Eq. 2), with the desired layer manipulations.

The neural renderer can essentially 'correct' any imperfections in the input geometry to accurately reconstruct the original video. These imperfections can include any trace effects that may not be represented by the input UV maps, such as shadows, reflections, loose clothing or hair, etc., or any other suitable trace effects. To accurately reconstruct these scene elements, the neural renderer can learn to correlate them with the input geometry. The layered property of the neural renderer can be beneficial for this aspect. For instance, if the full scene geometry can be given to the neural renderer at once as input, it may learn spurious correlations, or learn to associate a certain element (e.g. shadow) with a particular configuration of people, rather than an individual person. In some cases, however, by separating the input into layers and feeding each one of them individually, example implementations of the present disclosure can effectively limit the network's observational power, forcing it to place each missing scene element in the layer with the strongest signal. As one example, the strongest signal correlated with a person's shadow should be the person who can be casting it.

Additionally and/or alternatively, in some implementations, systems according to example aspects of the present disclosure can support manual editing of initial masks. For instance, in some difficult cases, the assignment of effects to layers may be incorrect. The user can thus encourage a better solution by manually editing the masks (e.g., expanding).

Example Training

Example implementations of the present disclosure can include learning the optimal parameters θ of the neural renderer and the set of latent textures $\{T^i\}_{i=0}^N$ by optimizing the learned decomposition for each frame.

One property of the learned decomposition can be that it will allow for accurate reconstruction of the original video. Formally, let $$E_{recon} = \frac{1}{T}\sum_t \|I_t - Comp(\mathcal{L}_t, o_t)\|_1, \quad (3)$$

where $\mathcal{L}_t$ are the output layers for frame t, and $o_t$ is the compositing order.

The reconstruction loss alone can be, in some cases, not enough to make the optimization converge from a random initialization. Thus, some example implementations of the present disclosure can bootstrap training by encouraging the learned alpha maps $\alpha_t^i$ to match the people segments that are associated with layer i. To do so, example implementations of the present disclosure can apply the following loss:

$$E_{mask} = \frac{1}{T}\frac{1}{N}\sum_t \sum_i D(m_t^i, \alpha_t^i), \quad (4)$$

where $m_t^i$ can be a trimap derived from the UV maps $UV_t^i$ (see FIG. 2), and D( ) can be a distance measure.

In some cases, since the UV mask does not include information from correlated effects such as shadows and reflections, $E_{mask}$ can be only used to bootstrap the model and can be turned off as optimization progresses.

Example implementations of the present disclosure can further apply a regularization loss to the opacities $\alpha_t^i$ to encourage the opacities to be spatially sparse. This loss can be defined as a mix of $L_1$ and an approximate—$L_0$:

$$E_{reg} = \frac{1}{T}\frac{1}{N}\sum_t\sum_i \gamma\|\alpha_t^i\|_1 + \Phi_0(\alpha_t^i) \quad (5)$$

where $\Phi_0(x)=2\cdot\text{Sigmoid}(5x)-1$ smoothly penalizes non-zero values of the alpha map, and γ controls the relative weight between the terms.

The proposed total loss can be then given by:

$$E_{total}=E_{recon}+\gamma_m E_{mask}+\beta E_{reg}, \quad (6)$$

where $\gamma_m$ and β control the relative weights of the terms.

Example High-Resolution Refinement and Detail Transfer

Example implementations of the present disclosure can include a multi-scale approach. This approach can include first training the proposed model using Eq. 6 on a down-sampled version of the original video. Example implementations of the present disclosure can then upsample the result to the original resolution using a separate lightweight refinement network, which consists of several residual blocks operating on each RGBA layer separately. The refinement network can receive as input the bilinearly upsampled (e.g., to the desired output size) concatenation of the RGBA output of the neural renderer, the texture sampled by the UVs input to the neural renderer, and/or the final feature maps output by the neural renderer preceding the RGBA output layer. The RGBA outputs of the refinement network can then be composited in the same manner as the outputs of the neural renderer. In some implementations, the upsampling network can be trained using only $L_1$ reconstruction loss.

Example implementations of the present disclosure can, in some implementations, avoid the additional expense of training with perceptual and adversarial losses by directly transferring high-resolution details from the original video in a post-processing step. The residual between the neural renderer output and the video can define the detail to transfer. The amount of the residual to transfer to each layer can be determined by the transmittance map $\tau_t^i$:

$$\tau_t^i=1.0-\text{Comp}_\alpha(\mathcal{L}_t\{L_t^j|j<i\},o_t\{j|j<i\}) \quad (7)$$

where $\text{Comp}_\alpha$ denotes the alpha channel of the composite produced by the neural renderer. The final layer colors can be defined by:

$$C_t^i=\text{Cnr}_t^i+\tau_t^i(I_t-\text{Comp}(\mathcal{L}_t,o_t)) \quad (8)$$

where Cnr can be the color produced by the neural renderer. Given this transfer, the upsampling network can need only to refine the predicted alpha mattes and produce reasonable colors in occluded regions, where ground-truth high-frequency details are not available.

Example UV Preprocessing

Video retiming effects can often disocclude people who were partially or even fully occluded in the original frames. In some implementations, such as in implementations wherein each person has a single texture map that can be learned jointly for the entire video, example implementations of the present disclosure can render disoccluded content (e.g., as long as example implementations of the present disclosure can correctly sample from it). To that end, example implementations of the present disclosure can ensure that all UV maps represent the full body of each individual as learnable from the video frames, even in the presence of occlusion. In some embodiments, inpainting and/or other estimation techniques can be used to fill in missing textures.

In some implementations, direct estimation (e.g., DensePose) and/or keypoint estimation (e.g., AlphaPose) can be used to determine the UV maps. Direct estimation of UV maps from images using existing tools such as DensePose may not produce UV maps in occluded regions. Additionally, direct estimation can suffer from erratic errors in visible regions. Keypoint estimators such as AlphaPose, by contrast, can tend to be more robust in the presence of occlusions. In addition, keypoints can easily be manually corrected when the estimator fails.

To produce full, clean UV maps, example implementations of the present disclosure can combine direct UV estimation and keypoint estimation. This can include training a neural network to predict UV maps from keypoints. To train the proposed keypoint-to-UV model, example implementations of the present disclosure can use a dataset curated to contain only single-person video frames. Another example dataset includes filmed video of approximately 10 minutes of a single person doing a variety of poses. Example implementations of the present disclosure then generate approximately 20K keypoint-UV training examples by running AlphaPose and DensePose on the original frames.

To predict full-body UV maps in the presence of occlusions, example implementations of the present disclosure can first estimate keypoints (e.g., using AlphaPose), track the keypoints (e.g., using PoseFlow), then manually clean up keypoints when the estimation or tracking fails. The keypoints-to-UV network can then process these keypoints to generate UV maps for occluded people.

Removing the layer decomposition component of the proposed model can result in a lack of generalization ability. While both models are able to reconstruct the original video, the non-layered model may struggle to disentangle people (e.g., as evidenced by segmentation failure of the girl in the white dress depicted in the Editing (Freeze) column of FIG. 8), and/or disentangle their correlations (e.g., as evidenced by the reflections in the Editing (Remove) column of FIG. 8 that are not fully removed when the person is removed).

Example User Interactions

There are several points in the proposed pipeline where the user can apply edits to control or improve the layer decomposition, including, for example, the assignment of people to layers, the ordering of layers over time, keypoint cleanup, and mask editing.

Figure 3:
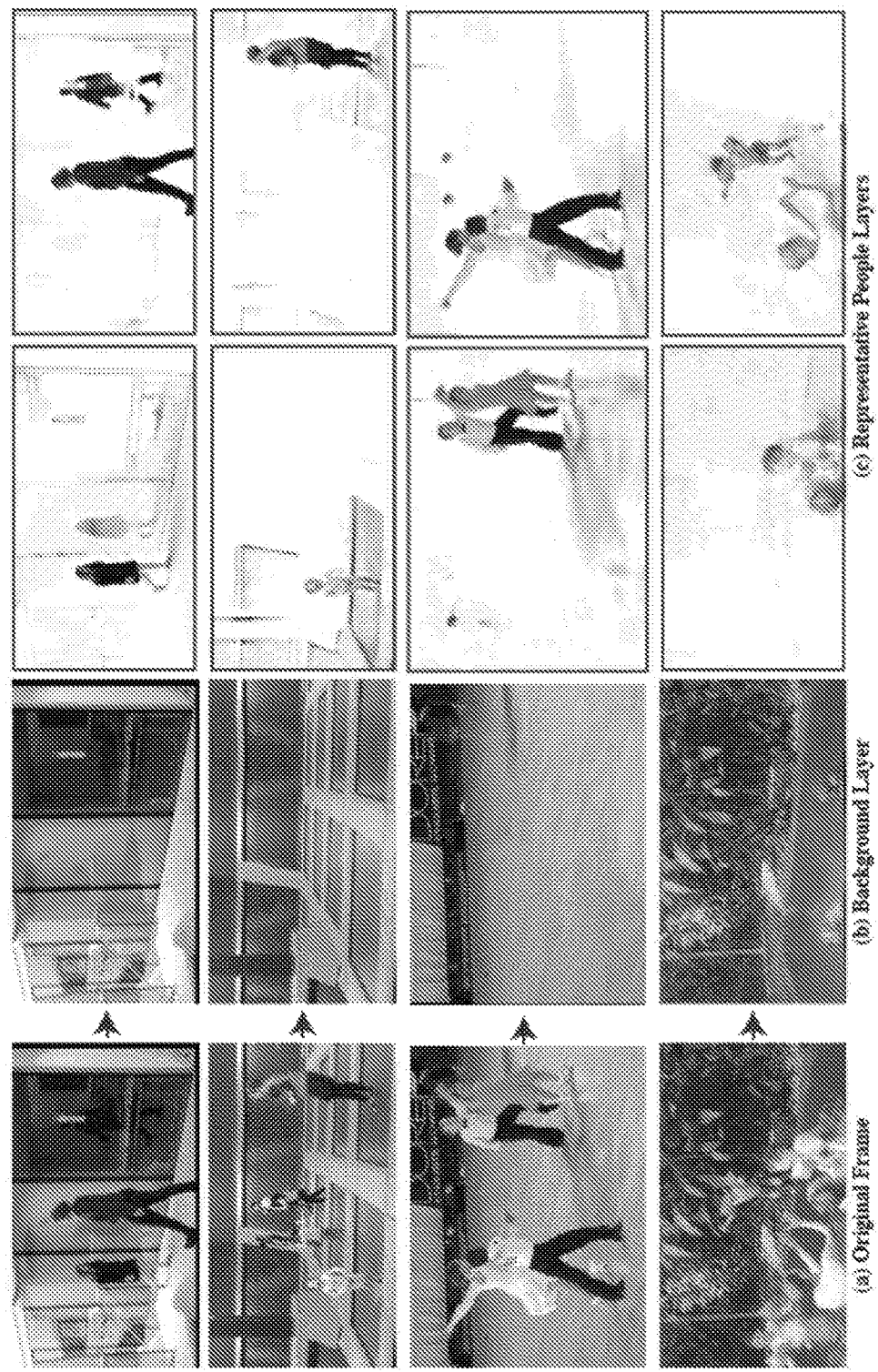
FIG. 3 depicts example layer decompositions by layered neural rendering techniques according to example embodiments of the present disclosure.

Multiple people may sometimes be difficult to separate with a consistent depth ordering (e.g., the dancing pairs in the Ballroom sequence depicted in FIG. 3). In these cases, the user may choose to collect multiple people onto the same layer. People on the same layer may not be independently retimed. Interactions between them (collisions, self-shadows, etc.) can be reconstructed faithfully.

In cases where the depth ordering of people can be well defined but changes over time (e.g., in the trampoline sequence depicted in FIG. 3), the assignment of people to layers may be varied. In some implementations, the neural renderer and neural texture are shared across layers, so changing the layer order does not change the training scheme.

In some cases, manual cleanup can be necessary to correct errors in the predicted keypoints. For instance, some existing keypoint detectors can still fail due to motion blur, occlusions, noise, etc. Example implementations of the present disclosure can include manually cleaned keypoints in particularly blurred or occluded regions (e.g., using a rotoscoping tool).

For some particularly difficult videos it may be necessary to encourage a particular decomposition by manually editing the initial masks $m_r$. Since the initial masks are refined by optimization, this editing may be loose.

Example Camera Tracking

When the input video contains a moving camera, example implementations of the present disclosure can include first estimating the camera motion using a feature-based tracking algorithm. For instance, example implementations of the present disclosure can model the camera motion at each frame using a homography transformation, which example implementations of the present disclosure may estimate robustly from matched ORB features between frames. When stabilizing small camera motions or natural hand shake, example implementations of the present disclosure can compute the homographies between each frame and a single reference frame (which may work better than tracking the camera over time), then use them to stabilize the input video. When the video contains large camera motion or substantial panning, example implementations of the present disclosure can estimate homographies over time between consecutive frames, use them to register all the frames with respect to a common coordinate system, then apply this coordinate system transformation to the background UV map to preserve the original camera motion. For instance, retiming a layer from frame t to $\bar{t}$ can be achieved by transforming the layer to the common coordinate system using the transformation at t, then applying the inverse transformation at $\bar{t}$.

Example Implementation Details

Example implementation details of one or more example implementations used to generate the described results are given below. These details are provided merely as one example implementation, and do not necessarily define any limitations of implementations according to example aspects of the present disclosure. Example implementations of the present disclosure first train the neural renderer for 2K epochs on the input video downsampled to size 256 along the smaller dimension (352×256 for the Ballroom sequence, 448×256 for all other videos). Example implementations of the present disclosure apply augmentation 75% of the time by resizing the frame by a uniformly random scaling factor in the range [1, 1.25], followed by random cropping. Next, example implementations of the present disclosure freeze the existing parameters and train an additional upsampling network to enhance the low-resolution result. This light-weight network can be trained for 500 epochs with L1 reconstruction loss without any data augmentation. The final output of the upsampling network has dimensions that are double the size of the low-resolution output (704×512 for the Ballroom sequence, 896×512 for all other videos). Example implementations of the present disclosure implement the proposed networks in PyTorch and use the Adam optimizer with a learning rate of 1e-3. Depending on video length and number of predicted layers, total training time takes between 6 and 12 hours on 4 NVIDIA Tesla P100 GPUs.

Example Experimental Results

Figure 9:
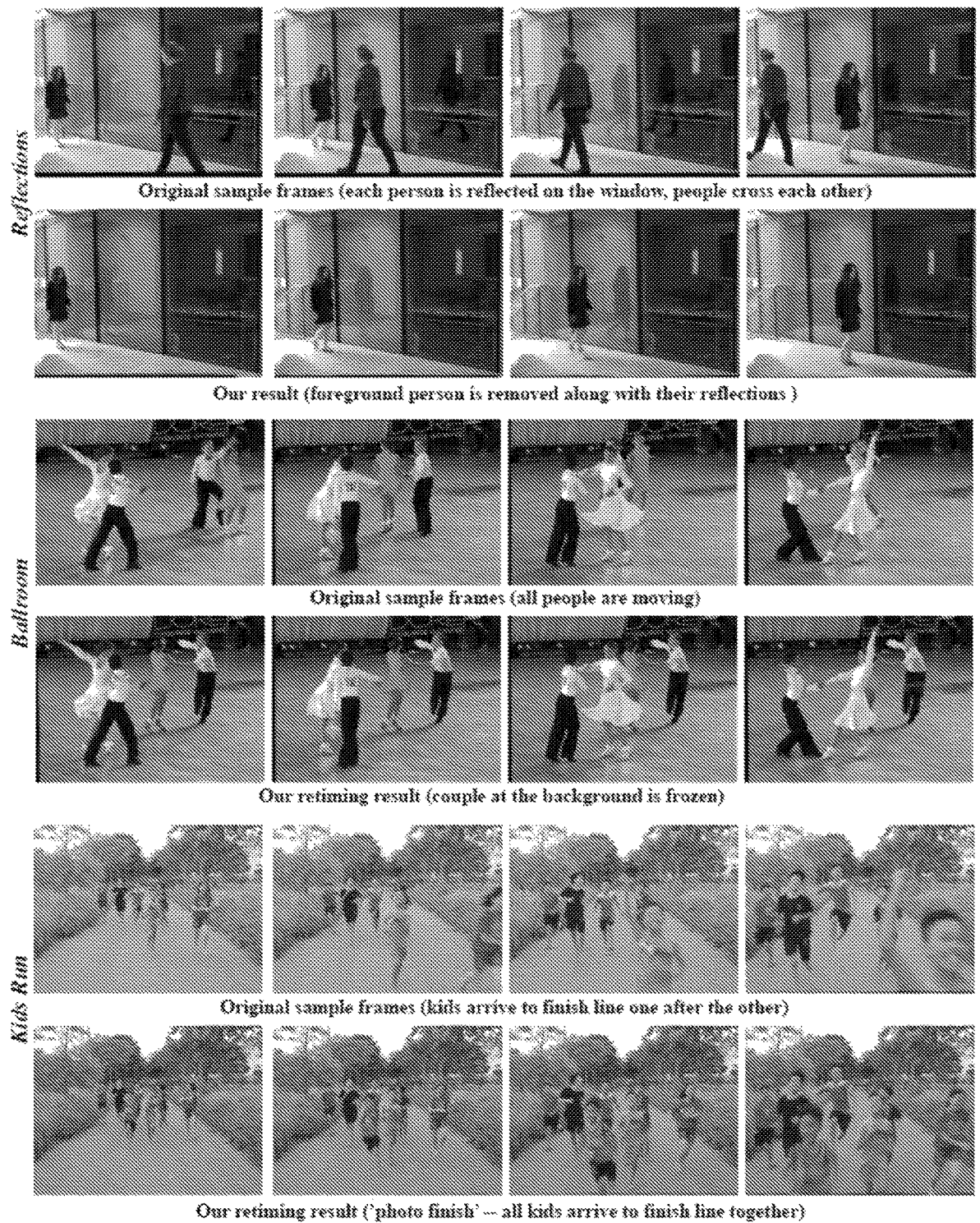
FIGS. 9A-C depict example retiming results according to example embodiments of the present disclosure.

Example implementations of the present disclosure tested the proposed method on a number of real-world videos, many of which were captured by hand-held cellphone cameras. The videos depict multiple people moving simultaneously and span a wide range of human actions (e.g., dancing, jumping, running) in complex natural environments. Representative frames from these videos are shown in FIG. 9.

Example Layer Decomposition

Several of the proposed layer decompositions are visualized in FIG. 3. For some videos (e.g., the ballroom scene depicted in FIG. 3 and the pool jumping scene depicted in FIG. 3), example implementations of the present disclosure manually group certain people into one layer. For other videos, each person has their own layer. For all the videos, the proposed model successfully disentangles the people into the layers. The layers capture fine details such as loose hair and clothing (e.g., foreground dancer's white dress in the ballroom scene), or objects attached to the people (e.g., children's floaties in the pool jump scene). This can be accomplished, according to example aspects of the present disclosure, despite initializing the proposed model with a rough people UV map that does not explicitly represent these elements. This ability of the proposed model to accurately segment the people region can be also illustrated more closely in FIG. 3.

Furthermore, the predicted layers can the people with other nontrivial visual changes in the scene that are related to them—for example, shadows cast on the floor by the different dancers (e.g., in the ballroom scene of FIG. 3), complicated reflections of two people crossing each other (e.g., in the reflections scene of FIG. 3), surface deformation (e.g., in the trampoline scene of FIG. 3), or water splashes (e.g., in the pool jump scene of FIG. 3) caused by people's motion.

Example Retiming and Editing Results

After obtaining the decomposed layers, example implementations of the present disclosure can produce a variety of retiming and editing effects via simple operations on the layers. Example implementations of the present disclosure show several such retiming results in FIGS. 7-10.

FIG. 9 depicts example frames of videos depicting multiple people performing a similar action (e.g., in the Splash scene, the Trampoline scene, and the Kids Run scene), but their motions are not in sync. For instance, in the Splash scene, the children jump into the pool one after the other. In the Trampoline scene, the periodic motions of the kids are independent. In both examples, example implementations of the present disclosure retime the people to align their motions. For Splash, several alignment points defined manually were sufficient to align the children's jumps. In Trampoline, because of the periodic nature of the motion, the alignment can be performed automatically using Correlation Optimized Warping (e.g., a variation of Dynamic Time Warping).

As illustrated, the proposed layer decomposition includes not just the person but also trace effects that are correlated with the person, Thus, as example implementations of the present disclosure can retime a person's layer, all the related trace effects (e.g., water splashes as they hit the water, trampoline deformations as they bounce on it) follow automatically with them, so as to produce a natural-looking retimed video.

Example implementations of the present disclosure can also use the proposed method to "freeze" people at a certain point in time while letting other people move as in the original video. This can create an effect that encourages viewers to focus their attention on the moving people while ignoring the rest of the motions in the original video. For example, in the Ballroom scene depicted in FIG. 9, example implementations of the present disclosure freeze the dancing couple in the back throughout the video, while the couple in front keeps moving. Here too, the shadows and reflections on the floor move realistically with the moving couple, while the shadows of the background couple remain static. Furthermore, disoccluded regions of the back couple are realistically rendered.

For instance, in the Kids Running scene depicted in FIG. 9, example implementations of the present disclosure show how the proposed model can scale to multiple layers to produce complex retiming effects involving many people. Example implementations of the present disclosure retime the original video, where the kids are crossing the faint finish line on the ground at different times, to produce a 'photo-finish' video, where all the kids cross the finish line together. Example implementations of the present disclosure can achieve this result, for instance, by slowing down the layers of the children that run offscreen. Even though this sequence involves many individuals, the proposed model can be able to obtain clean mattes for each child. In addition, occluded people and large occluded regions in the background can be realistically inpainted while handling significant motion blur that exists in the input video.

Figure 4:
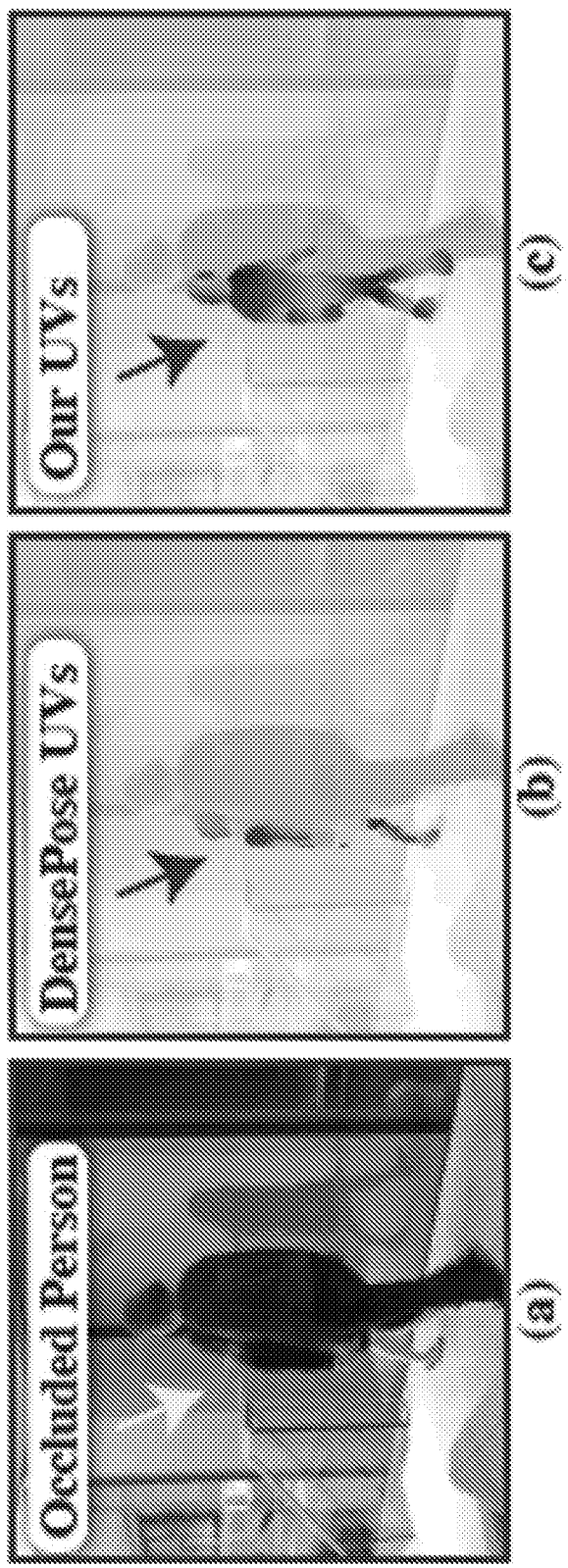
FIGS. 4A-C depict example images and UV maps according to example embodiments of the present disclosure.
Figure 8:
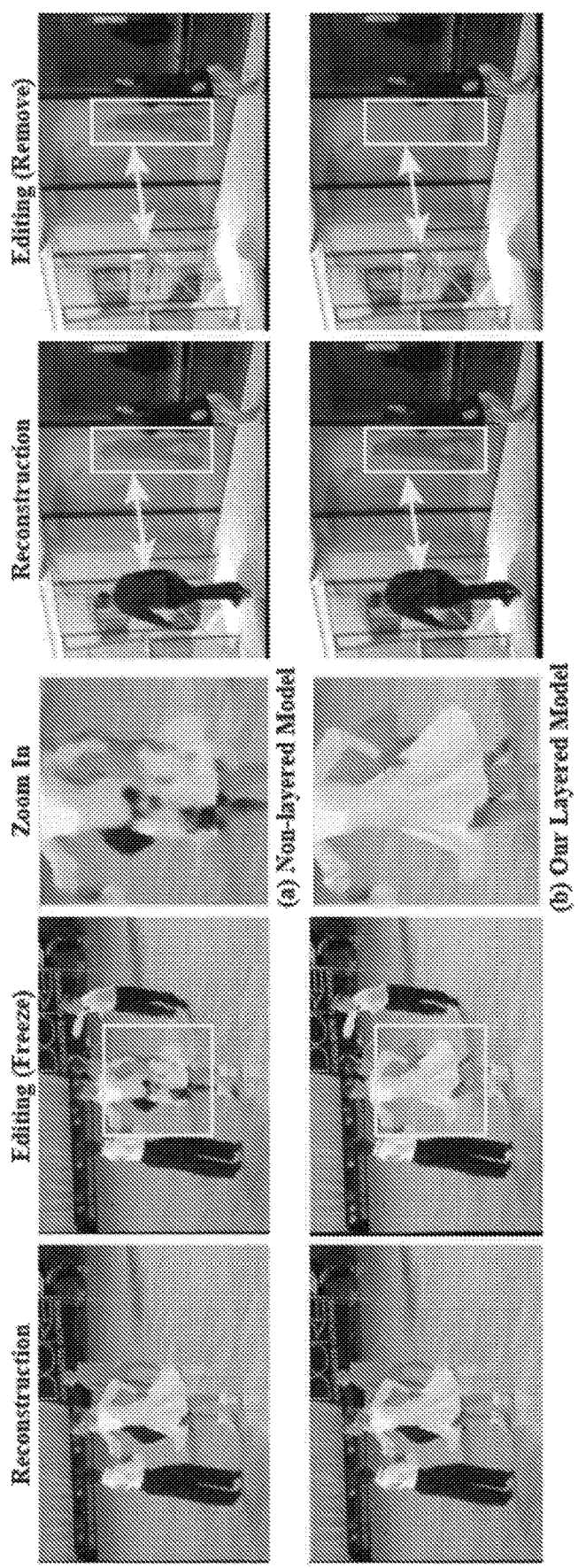
FIG. 8 depicts example results of layered versus non-layered rendering according to example embodiments of the present disclosure.

As mentioned, in addition to retiming effects, the proposed method can also support easy removal of people in video due to the layered representation of example implementations of the present disclosure. For instance, FIGS. 4 and 8 depict scenes demonstrating person removal in a video containing two people crossing paths in front of a window. Here, for instance, the proposed model can perform several nontrivial tasks. The model can completely disocclude the person walking in the back. For example, as depicted in FIG. 4, the model can generate an object map (UV map) that captures the portion of the person walking in the back that is depicted. The model can associate each person properly with their reflection and shadow. The model can disentangle the two reflections when they overlap, despite the fact that none of these elements are represented explicitly by the model. A traditional video editing pipeline may encounter difficulty achieving these results. For instance, the reflections may have to be tracked along with the people to perform proper removal. Additionally, the person in the back may have to be manually inpainted at the point where they are occluded by the person in front. Thus, one advantage of the proposed method can be that by merely inputting UVs for each person in a separate layer, and turning those layers 'on and off', example implementations of the present disclosure can achieve the same result with significantly less manual work.

Figure 10:
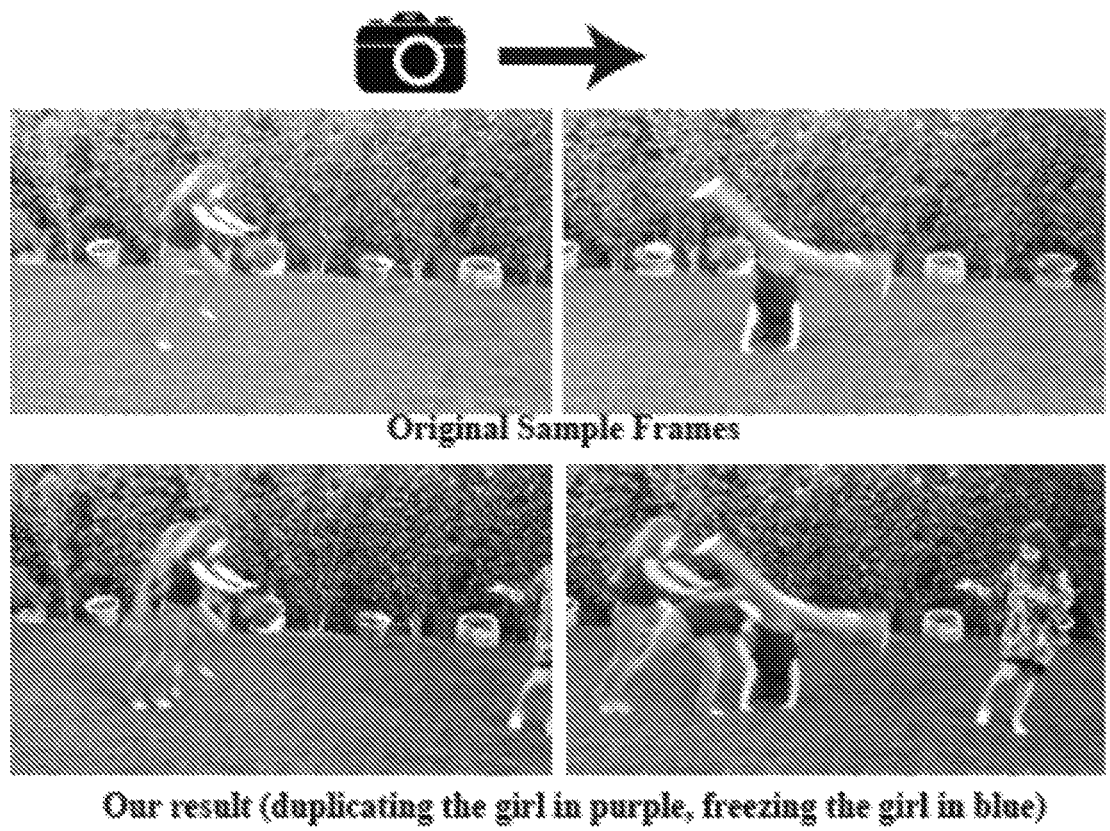
FIG. 10 depicts example retiming results according to example embodiments of the present disclosure.

FIG. 10 depicts an example according to aspects of the present disclosure where the original camera motion can be preserved in the proposed retimed result. For instance, as depicted in FIG. 10, the girl on the left can be duplicated with a short time offset between each of her copies. The girl on the right, wearing blue, can be frozen from a prior focus region of the camera while the camera can be panning as in the original video.

Example Layered Vs. Non-Layered Neural Rendering

Another example aspect of the present disclosure can include a non-layered model, (e.g., a model that takes as input a single sampled texture map representing all the people in the frame as well as the background and directly outputs an RGB reconstruction of the frame). The non-layered model may be simpler than the layered model, for example. An example non-layered model is compared to an example layered model. This baseline follows the deferred neural rendering approach.

FIG. 8 depicts a comparison between reconstruction and editing results produced by an example layered model and an example non-layered model. As can be seen, the non-layered model can reconstruct the original frames fairly well despite the missing information and noise in the UV maps. However, when editing is performed, the non-layered model can be unable to generalize to new compositions of people. This is evidenced, for instance, by the significant visual artifacts in the Ballroom editing example depicted in FIG. 8.

For instance, to produce editing effects, the non-layered model can be required to generalize to new UV compositions of people in configurations that were never seen during training. This can result in challenges in producing realistic-looking results based solely on L1 reconstruction loss. The proposed layered approach can avoid this generalization issue because editing can be performed as a post-processing on the predicted layers (e.g., the same outputs produced during training). Furthermore, when the input to the model can be a composition of all the people in the frame rather than separated UVs, the model can more easily reconstruct the original frame without necessarily capturing meaningful correlations. For instance, it may not be required to disentangle separately-moving parts of the scene. This can be exemplified in the Reflection editing result, wherein the non-layered model encounters difficulty in learning the correct relationships between the different people and their reflections.

Another benefit of the layered model can be that example implementations of the present disclosure can grab high-resolution details from the input video. The non-layered neural rendering model may not support this and furthermore can require extensive training time and adversarial losses to achieve comparable visual quality.

Corrections

Figure 6:
FIG. 6 depicts manual editing of initial masks according to example embodiments of the present disclosure.
Figure 7:
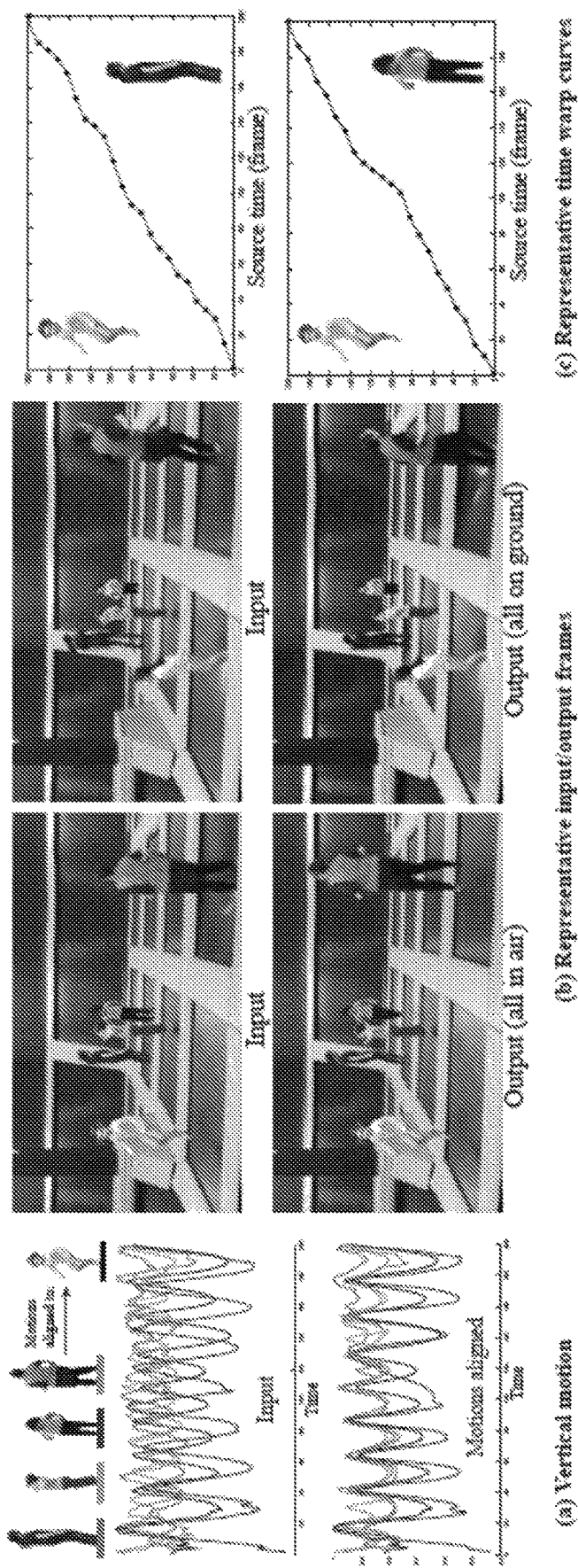
FIGS. 7A-C depicts automatic motion alignment techniques according to example embodiments of the present disclosure.

While the proposed can often successfully decompose layers, in some particularly difficult cases manual correction can be required. For instance, in some cases, artifacts can be present in the decomposed layers. One artifact example implementations of the present disclosure observed can be in the background layer in the Splash scenes depicted in FIG. 6. As depicted in FIG. 6, artifacts can be seen in regions of the pool where the model never gets to observe the ground-truth appearance (e.g., those regions are always occluded by people). In these cases, the artifacts can be corrected with an inpainting network (e.g., a separate inpainting network). Advantageously, backgrounds can generally be easier to inpaint than deformable subjects like people. The proposed model can address these deformable objects to provide complete inpainting support. For instance, an inpainting step can be added to the layers (e.g., using a neural network or other inpainting system).

Additionally, some time-varying aspects of the background can become associated with layers. For instance, in the Ballroom scene, a purple light appears over the background girl's head because the light colors change throughout the video. Thus, as a temporally varying signal, the lights are included in one of the foreground layers. In this case, the purple light can be in the front couple's layer, which can be then rendered on top of the frozen background couple. Such artifacts can be avoided if some flexibility is given in the representation of the background. For instance, the background can be allowed to vary with time. The representational capacity of the time-varying background must be balanced against the trace effects. For instance, example implementations of the present disclosure can desirably still be able to represent trace effects caused by moving people, such as clothing and shadows.

Example Model Architectures

Example aspects of the present disclosure can utilize a mask error $E_{mask}$. For instance, masks can be trimaps with values in [0,0.5,1], where the uncertain area is produced by morphological dilation of the binary UV mask. For a trimap m, let $b_0$ be the binary mask of the pixels where m=0, with $b_{0.5}$ and $b_1$ defined likewise. In some implementations, the foreground can be upweighted and the uncertain areas can be downweighted to avoid poor local minima. The final mask error function is:

$$D(m,\alpha)=5\|b_1 h(1.0-\alpha)\|_1+0.2\|b_{0.5}h\alpha\|_1+\|b_0 h\alpha\|_1 \quad (9)$$

where h is the Hadamard (element-wise) product.

One example training schedule defined by the training epoch e is given below:

$$\gamma_m = \begin{cases} 50 & e \le 50 \\ 5 & e \le 100 \\ 0 & e > 100 \end{cases} \quad (10)$$

$$\gamma = \begin{cases} 2.0 & e \le 200 \\ 0 & e > 200 \end{cases}$$

$$\beta = 0.005$$

This schedule can include a heavy initial loss on the masking term to force the optimization towards a plausible solution. The schedule can then relax the loss to allow the optimization to introduce effects not present in the masks.

Example network architecture is given below. In some or all networks, padding is mode 'same'. As used herein, 'bn' refers to batch normalization, 'in' refers to instance normalization, 'convt' refers to convolutional transpose, 'leaky' refers to leaky RELU with slope −0.2, 'skipk' refers to a skip connection with layer k, and 'resblock' denotes a residual block consisting of conv, instance norm, RELU, conv, instance norm.

Example neural renderer architecture is given below:

| layer(s) | out channels | stride | activation |
| --- | --- | --- | --- |
| 4 × 4 conv | 64 | 2 | leaky |
| 4 × 4 conv, bn | 128 | 2 | leaky |
| 4 × 4 conv, bn | 256 | 2 | leaky |
| 4 × 4 conv, bn | 256 | 2 | leaky |
| 4 × 4 conv, bn | 256 | 2 | leaky |
| 4 × 4 conv, bn | 256 | 1 | leaky |
| 4 × 4 conv, bn | 256 | 1 | leaky |
| skip5, 4 × 4 convt, bn | 256 | 2 | relu |
| skip4, 4 × 4 convt, bn | 256 | 2 | relu |
| skip3, 4 × 4 convt, bn | 128 | 2 | relu |
| skip2, 4 × 4 convt, bn | 64 | 2 | relu |
| skip1, 4 × 4 convt, bn | 64 | 2 | relu |
| 4 × 4 conv | 4 | 1 | tanh |

Example upsampling network architecture is given below. The upsampling network can predict a residual image that is added to the bilinearly upsampled composited neural renderer output. Example upsampling network architecture is as follows:

| layer(s) | output channels | stride | activation |
| --- | --- | --- | --- |
| 3 × 3 conv, in | 64 | 1 | relu |
| 3 × 3 resblock | 64 | 1 | relu |
| 3 × 3 resblock | 64 | 1 | relu |
| 3 × 3 resblock | 64 | 1 | relu |
| 3 × 3 conv | 4 | 1 | none |

The keypoint-to-UV network architecture can be the same as the neural renderer architecture where the final layer is replaced by two heads, including a final convolutional layer with 25 output channels to predict body part and background classification and a convolutional layer with 48 output channels to regress UV coordinates for each of the 24 body parts. The body part classifier can be trained with cross-entropy loss and train the predicted UV coordinates with L1 loss. The regression loss on the UV coordinates may be considered for a body part if the pixel lies within the specific part, as defined by the ground-truth UV map.

Example Devices and Systems

Figure 11A:
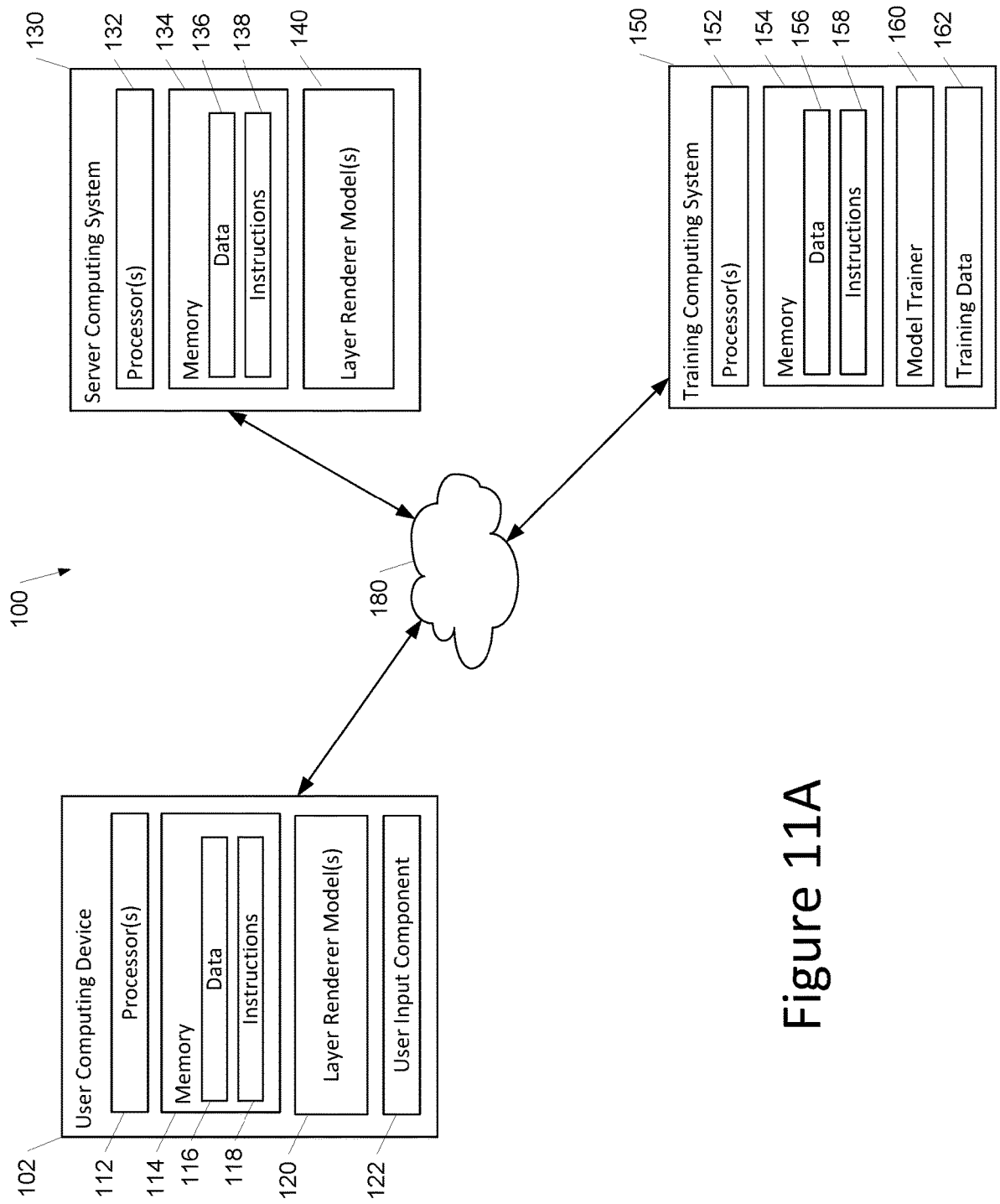
FIG. 11A depicts a block diagram of an example computing system according to example embodiments of the present disclosure.

FIG. 11A depicts a block diagram of an example computing system 100 that performs layered neural rendering according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more layer renderer models 120. For example, the layer renderer models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example layer renderer models 120 are discussed with reference to FIGS. 2 and 12-13.

In some implementations, the one or more layer renderer models 120 can be received from the server computing system 130 over network 180, stored in the user computing device memory 114, and then used or otherwise implemented by the one or more processors 112. In some implementations, the user computing device 102 can implement multiple parallel instances of a single layer renderer model 120 (e.g., to perform parallel layered neural rendering across multiple instances of layer renderer models 120).

More particularly, the layer renderer model 120 can receive video data as input and decompose the video data into one or more layers, each layer associated with and containing primarily video data depicting one or more designated objects. For example, the layer renderer model can generate one or more object maps (e.g., by an object map generation model) and wrap texture data to a deep texture map based on the object maps. Additionally, the layer renderer model can associate trace effects in the video data with the objects that cause or otherwise affect the trace effects, and include the trace effects in a layer depicting a respective object.

Additionally or alternatively, one or more layer renderer models 140 can be included in or otherwise stored and implemented by the server computing system 130 that communicates with the user computing device 102 according to a client-server relationship. For example, the layer renderer models 140 can be implemented by the server computing system 140 as a portion of a web service (e.g., a layered neural rendering service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that can be sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or can be otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned layer renderer models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 and 12-13.

The user computing device 102 and/or the server computing system 130 can train the models 120 and/or 140 via interaction with the training computing system 150 that can be communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected.

The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or can be otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the layer renderer models 120 and/or 140 based on a set of training data 162. The training data 162 can include, for example, an external dataset of keypoint and UV map pairs. Additionally and/or alternatively, the training data 162 can include video data. As one example, the training data 162 for an object map generation model can include a dataset curated to contain only single-person video frames. Another example dataset includes filmed video of approximately 10 minutes of a single person doing a variety of poses.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 11A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 11B:
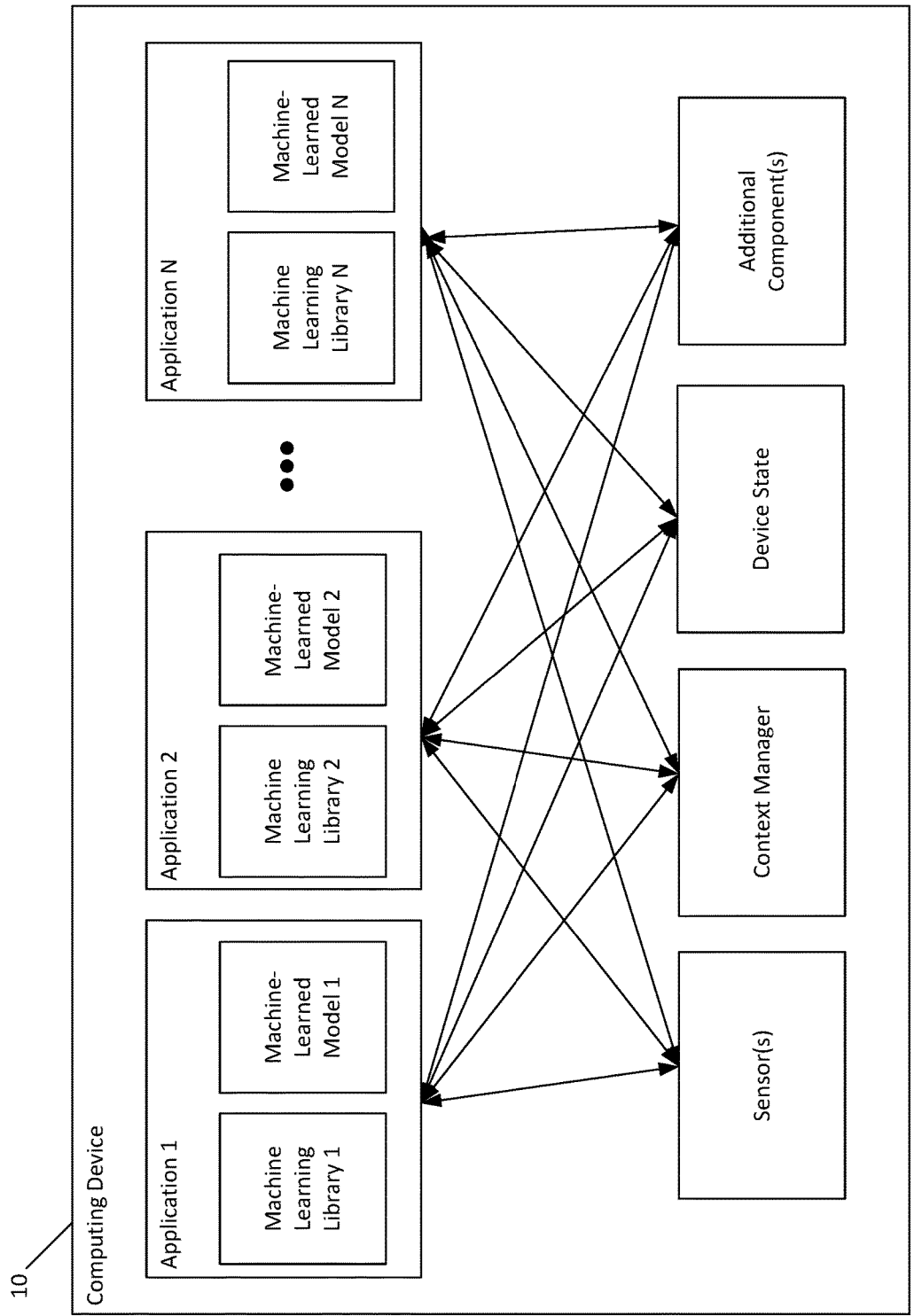
FIG. 11B depicts a block diagram of an example computing device according to example embodiments of the present disclosure.

FIG. 11B depicts a block diagram of an example computing device 10 that may perform, among other functions, layered neural rendering according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 11B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application can be specific to that application.

Figure 11C:
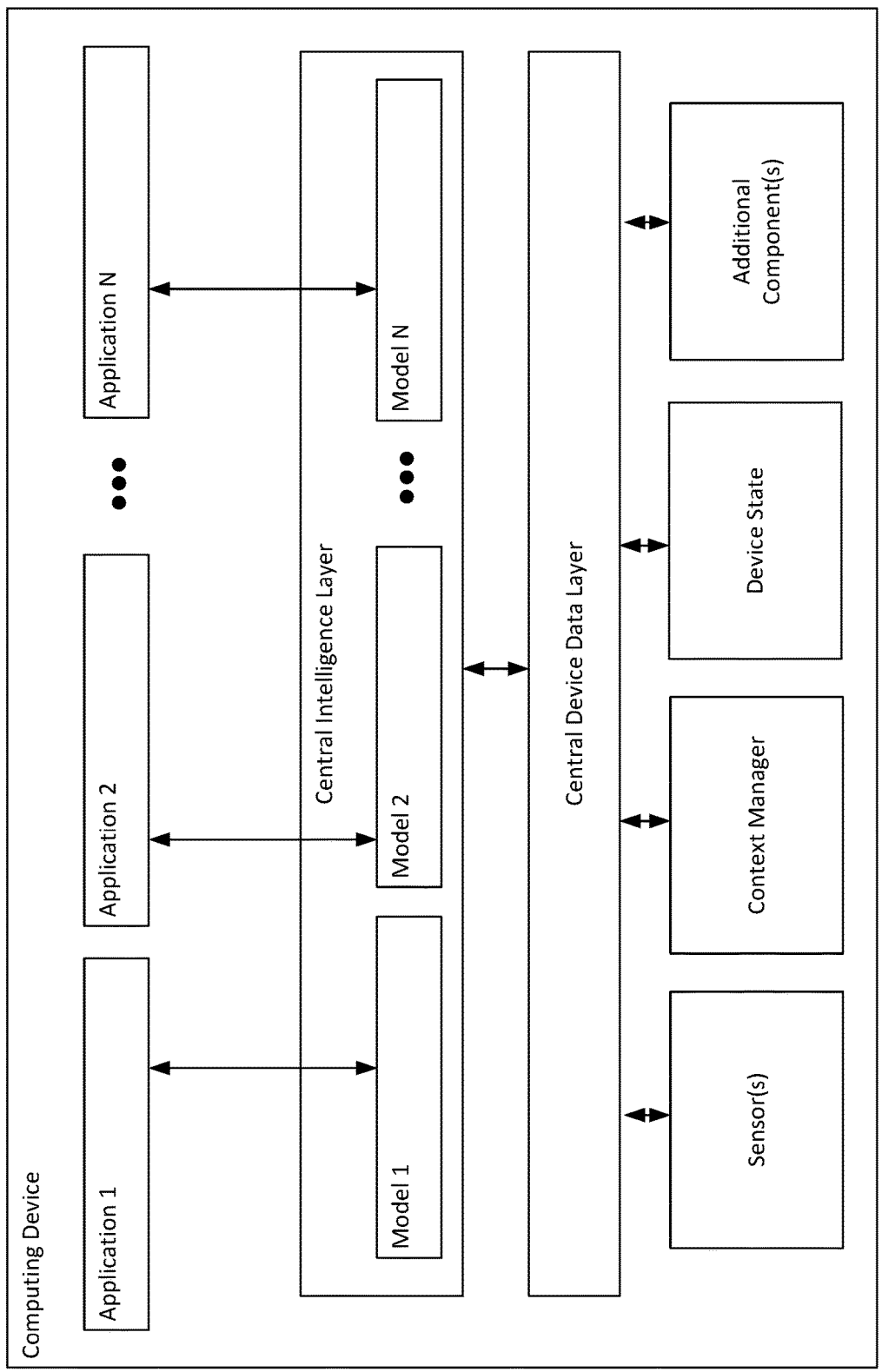
FIG. 11C depicts a block diagram of an example computing device according to example embodiments of the present disclosure.

FIG. 11C depicts a block diagram of an example computing device 50 that performs according to example embodiments of the present disclosure. The computing device 50 can be a user computing device or a server computing device.

The computing device 50 includes a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 11C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer can be included within or otherwise implemented by an operating system of the computing device 50.

The central intelligence layer can communicate with a central device data layer. The central device data layer can be a centralized repository of data for the computing device 50. As illustrated in FIG. 11C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 12:
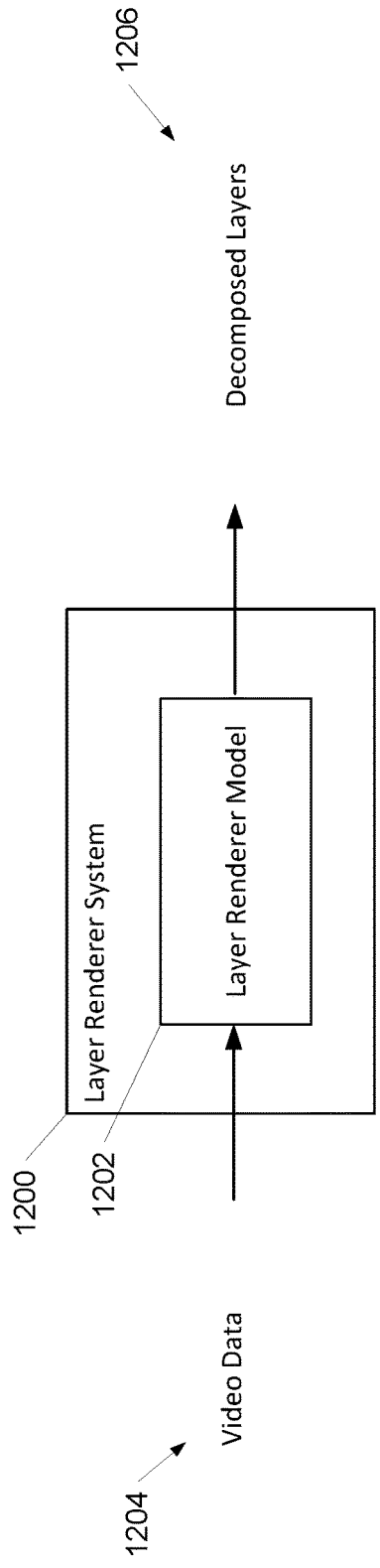
FIG. 12 depicts a block diagram of an example layer renderer system according to example embodiments of the present disclosure.

FIG. 12 depicts a block diagram of an example layer renderer system 1200 according to example embodiments of the present disclosure. In some implementations, the layer renderer model 1200 can be trained to receive a set of input data 1204 descriptive of video data and, as a result of receipt of the input data 1204, provide output data 1206 that includes decomposed video layers. Thus, in some implementations, the layer renderer system 1200 can include a layer renderer model 1202 that can be operable to decompose video data into one or more layers, including, for example, a background layer and/or one or more object layers.

Figure 13:
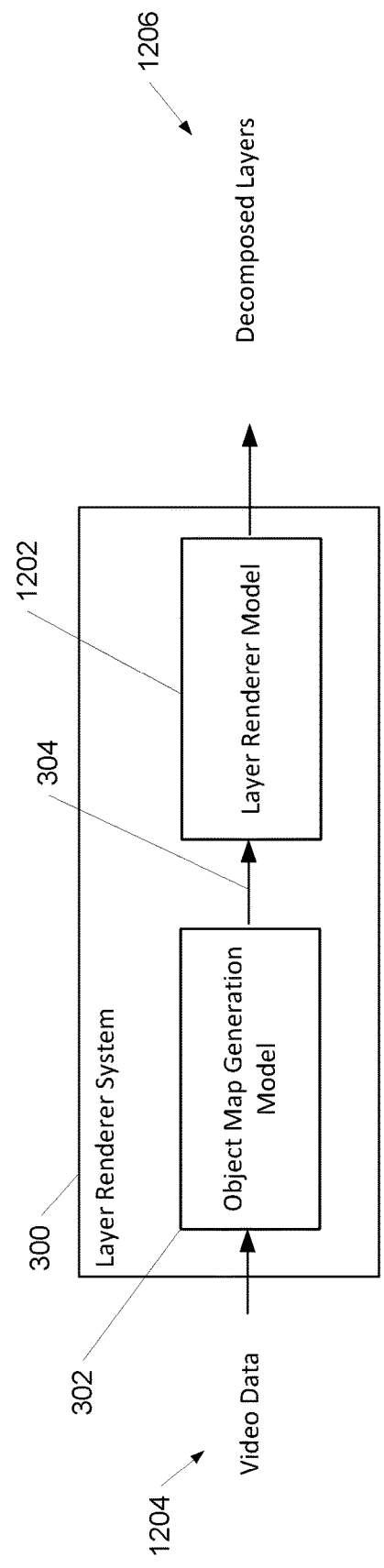
FIG. 13 depicts a block diagram of an example layer renderer system according to example embodiments of the present disclosure.

FIG. 13 depicts a block diagram of an example layer renderer system 1300 according to example embodiments of the present disclosure. The layer renderer system 300 can be similar to layer renderer system 1200 of FIG. 12 except that layer renderer system 300 further includes an object map generation model 302. For instance, the object map generation model 302 can be configured to generate object maps 304 based on the input data 1204. As one example, the object map generation model 302 can be trained (e.g., on a training dataset of keypoint and object map pairs) to generate object maps 304 by recognizing keypoints in the video data and determining an object map based on the keypoints. The object maps 304 can be provided as input to the layer renderer model 1202.

Example Methods

Figure 14:
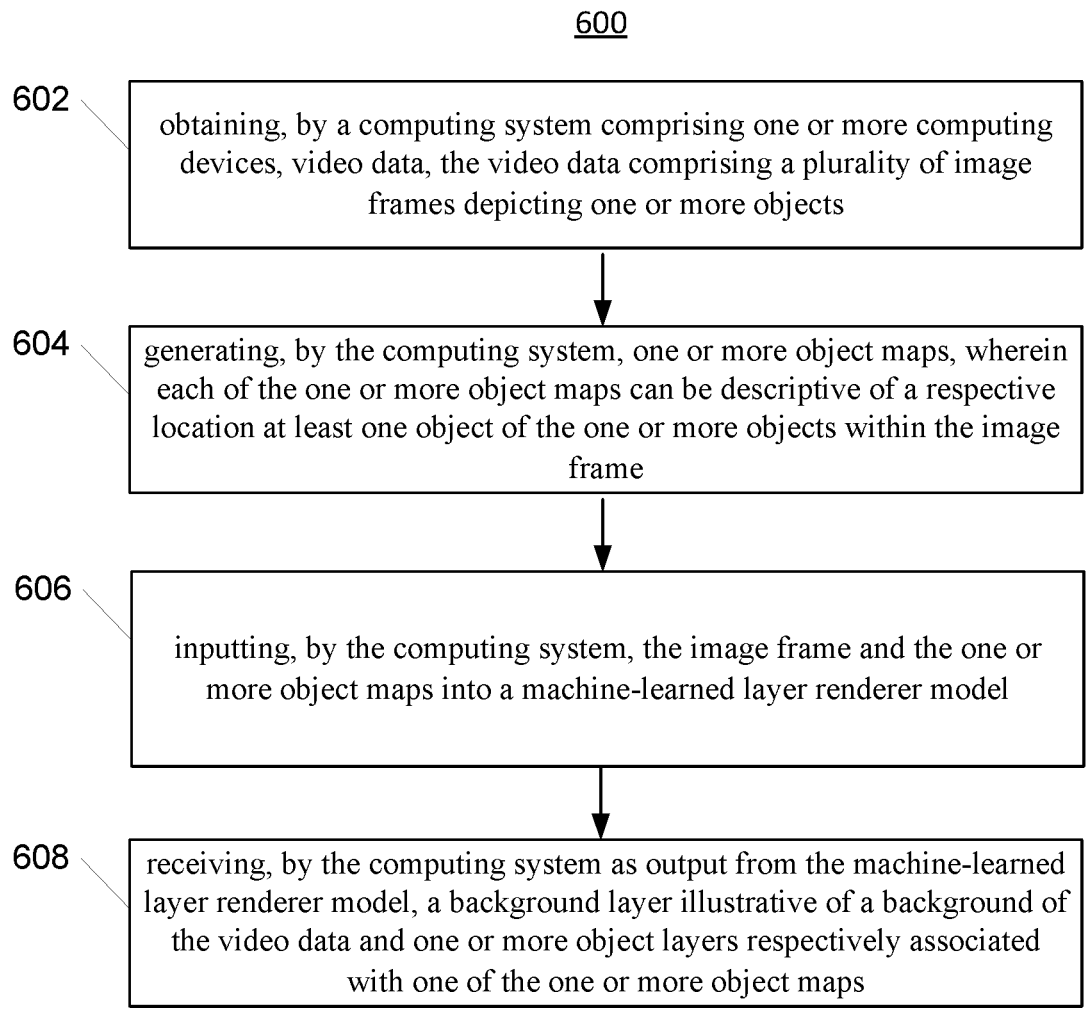
FIG. 14 depicts a flowchart diagram of an example method for decomposing videos into multiple layers that can be re-combined with modified relative timings according to example embodiments of the present disclosure.

FIG. 14 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system including one or more computing devices can obtain video data. The video data can include a plurality of image frames depicting one or more objects. For example, the video data can be a video captured by a mobile device, video camera, or any other suitable video capturing device. The video data can be stored in any suitable manner. For instance, the video data can be stored in computer-readable memory in any suitable format, such as a digital file format (e.g., a .mp4 file format, a .wav file format, etc.).

At 604, the computing system can generate one or more object maps, wherein each of the one or more object maps can be descriptive of a respective location of at least one object of the one or more objects within the image frame. For example, the one or more object maps can include UV maps. The object map(s) can indicate a general shape of the object, but may leave out trace effects (e.g., flowing clothing, particles or other environmental elements affected by the object, shadows, reflections, etc.). In some embodiments, for instance, generating the one or more object maps can include identifying, by the computing system, one or more keypoints and obtaining, by the computing system, one or more UV maps based on the keypoints. The objects maps can be identified (e.g., manually and/or by the computing system) based at least in part on the video data.

At 606, the computing system can input the image frame and the one or more object maps into a machine-learned layer renderer model. At 608, the computing system can receive, as output from the machine-learned layer renderer model, a background layer illustrative of a background of the video data and one or more object layers respectively associated with one of the one or more object maps. For example, the object layers can be illustrative of the one or more objects and/or trace effects resultant from the one or more objects interacting with an environment.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example can be provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it can be intended that the present disclosure cover such alterations, variations, and equivalents.

What is claimed is:

1. A computer-implemented method for decomposing videos into multiple layers that can be individually retimed and re-combined with modified relative timings, the computer-implemented method comprising:
    obtaining, by a computing system comprising one or more computing devices, video data, the video data comprising a plurality of image frames depicting one or more objects; and
    for each of the plurality of image frames:
        generating, by the computing system, one or more object maps, wherein each of the one or more object maps is descriptive of a respective location of at least one object of the one or more objects within the image frame;
        inputting, by the computing system, the image frame and the one or more object maps into a machine-learned layer renderer model, comprising iteratively individually inputting each of the one or more object maps into the machine-learned layer renderer model;
        receiving, by the computing system as output from the machine-learned layer renderer model, a background layer illustrative of a background of the video data and one or more object layers respectively associated with one of the one or more object maps, wherein each of the one or more object layers comprises image data illustrative of the at least one object and one or more trace effects at least partially attributable to the at least one object; and generating, by the computing system, a retimed video by:
retiming at least one of the background layer or the one or more object layers; and
re-combining the one or more retimed layers.

2. The computer-implemented method of claim 1, wherein inputting, by the computing system, the image frame and the one or more object maps into the machine-learned layer renderer model comprises iteratively individually receiving, as output from the machine-learned layer renderer model and by the computing system, each of the one or more object layers respective to the one or more object maps.

3. The computer-implemented method of claim 1, wherein the background layer and the one or more object layers comprise one or more color channels and an opacity matte.

4. The computer-implemented method of claim 1, wherein the machine-learned layer renderer model comprises a neural network.

5. The computer-implemented method of claim 1, wherein the machine-learned layer renderer model has been trained based at least in part on a reconstruction loss, a mask loss, and a regularization loss.

6. The computer-implemented method of claim 5, wherein the training was performed on downsampled video and then upsampled.

7. The computer-implemented method of claim 1, wherein the one or more object maps comprise one or more texture maps.

8. The computer-implemented method of claim 1, wherein the one or more object maps comprise one or more re-sampled texture maps.

9. The computer-implemented method of claim 8, wherein obtaining, by the computing system, one or more object maps comprises:
obtaining, by the computing system, one or more UV maps, each of the UV maps indicative of the at least one object of the one or more objects depicted within the one or more frames;
obtaining, by the computing system, a background deep texture map and one or more object deep texture maps; and
resampling, by the computing system, the one or more object deep texture maps based at least in part on the one or more UV maps.

10. The computer-implemented method of claim 9, wherein generating, by the computing system, the one or more UV maps comprises:
identifying, by the computing system, one or more keypoints; and
obtaining, by the computing system, one or more UV maps based on the one or more keypoints.

11. The computer-implemented method of claim 1, further comprising:
transferring, by the computing system, high resolution details of the video data in a post processing step subsequent to receiving the background layer and the one or more object layers.

12. A computing system configured to decompose video data into a plurality of layers, the computing system comprising:
one or more processors; and
one or more non-transitory computer-readable media that store instructions that, when executed by the one or more processors, cause the computing system to perform operations, the operations comprising:
obtaining video data, the video data comprising a plurality of image frames depicting one or more objects; and
for each of the plurality of image frames:
generating one or more object maps, wherein each of the one or more object maps is descriptive of a respective location of at least one object of the one or more objects within the image frame;
inputting the image frame and the one or more object maps into a machine-learned layer renderer model, comprising iteratively individually inputting each of the one or more object maps into the machine-learned layer renderer model;
receiving, as output from the machine-learned layer renderer model, a background layer illustrative of a background of the video data and one or more object layers respectively associated with one of the one or more object maps, wherein each of the one or more object layers comprises image data illustrative of the at least one object and one or more trace effects at least partially attributable to the at least one object; and
generating, by the computing system, a retimed video by:
retiming at least one of the background layer or the one or more object layers; and
re-combining the one or more retimed layers.

13. The computing system of claim 12, wherein inputting the image frame and the one or more object maps into the machine-learned layer renderer model comprises iteratively individually receiving, as output from the machine-learned layer renderer model and by the computing system, each of the one or more object layers respective to the one or more object maps.

14. The computing system of claim 12, wherein the background layer and the one or more object layers comprise one or more color channels and an opacity matte.

15. The computing system of claim 12, wherein the machine-learned layer renderer model comprises a neural network.

16. The computing system of claim 12, wherein the machine-learned layer renderer model has been trained based at least in part on a reconstruction loss, a mask loss, and a regularization loss.

17. The computing system of claim 16, wherein the training was performed on downsampled video and then upsampled.

18. The computing system of claim 12, wherein the one or more object maps comprise one or more texture maps.

19. The computing system of claim 12, wherein obtaining one or more object maps comprises:
obtaining one or more UV maps, each of the UV maps indicative of the at least one object of the one or more objects depicted within the one or more frames;
obtaining a background deep texture map and one or more object deep texture maps; and
resampling the one or more object deep texture maps based at least in part on the one or more UV maps.

20. The computing system of claim 19, wherein obtaining the one or more UV maps comprises:
identifying one or more keypoints; and
generating one or more UV maps based on the one or more keypoints.

21. The computing system of claim 12, wherein the instructions further comprise:

transferring high resolution details of the video data in a post processing step subsequent to receiving the background layer and the one or more object layers.

22. The computing system of claim 12, wherein the one or more trace effects comprise at least one of: shadows, reflections, splashes, or motion of loose clothing.

\* \* \* \* \*